US011356649B2

(12) United States Patent
Kagotani et al.

(10) Patent No.: US 11,356,649 B2
(45) Date of Patent: Jun. 7, 2022

(54) INTEGRATED THREE DIMENSIONAL DISPLAY AND METHOD OF RECORDING IDENTIFICATION INFORMATION

(71) Applicant: TOPPAN PRINTING CO., LTD., Tokyo (JP)

(72) Inventors: Akihito Kagotani, Tokyo (JP); Kozue Umeda, Tokyo (JP); Soko Koda, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 0 days.

(21) Appl. No.: 17/231,542

(22) Filed: Apr. 15, 2021

(65) Prior Publication Data

US 2021/0250569 A1 Aug. 12, 2021

Related U.S. Application Data

(63) Continuation of application No. PCT/JP2019/040513, filed on Oct. 15, 2019.

(30) Foreign Application Priority Data

Oct. 16, 2018 (JP) .............................. JP2018-195365

(51) Int. Cl.
*H04N 13/128* (2018.01)
*H04N 13/302* (2018.01)
(Continued)

(52) U.S. Cl.
CPC ......... *H04N 13/128* (2018.05); *G03H 1/0005* (2013.01); *G03H 1/14* (2013.01); *H04N 13/302* (2018.05); *G03H 2001/0088* (2013.01)

(58) Field of Classification Search
CPC .. H04N 13/128; H04N 13/302; G03H 1/0005; G03H 1/14; G03H 2001/0088;
(Continued)

(56) References Cited

U.S. PATENT DOCUMENTS

2004/0258274 A1* 12/2004 Brundage .............. G07D 7/207
382/100
2005/0122549 A1* 6/2005 Goulanian ............... G03H 1/30
359/3
(Continued)

FOREIGN PATENT DOCUMENTS

JP 2002-208053 A 7/2002
JP 2005-215569 A 8/2005
(Continued)

OTHER PUBLICATIONS

International Searching Authority, "International Search Report," issued in connection with International Patent Application No. PCT/JP2019/040513, dated Jan. 7, 2020.
(Continued)

*Primary Examiner* — Tung T Vo
(74) *Attorney, Agent, or Firm* — Foley & Lardner LLP

(57) ABSTRACT

An integrated three-dimensional display includes a recording surface which includes a calculated element region in which phase components of light from light converging points of a holographic reconstructed image are calculated, and a phase angle recorded area for recording a phase angle calculated based on the phase components. The phase angle recorded area includes a plurality of monochromatic regions having a uneven structure surface. The phase angle is recorded in an overlap area in which the calculated element region and the phase angle recorded area overlap each other. Light converges on the light converging points at specific distances from the recording surface, the specific distances being determined for the respective light converging points even when light reflected from the plurality of monochromatic regions converges.

18 Claims, 29 Drawing Sheets

(51) Int. Cl.
   *G03H 1/00* (2006.01)
   *G03H 1/14* (2006.01)

(58) Field of Classification Search
   CPC ..... G03H 2001/2263; G03H 2001/266; G03H 1/0244; G03H 2001/303; G03H 2210/53; G03H 2224/04; G03H 2250/10; G03H 2250/40; G03H 2250/42; G03H 2270/52; G03H 1/0011; G03H 1/0808; G03H 1/28; G03H 1/30; G03H 1/0841; G03H 1/268; G03H 2210/12; B42D 25/373; B42D 25/328; G11B 7/0065; G11B 7/24044; G11B 7/24094; G09F 19/125
   USPC .......................................................... 348/51
   See application file for complete search history.

(56) References Cited

U.S. PATENT DOCUMENTS

| | | | |
|---|---|---|---|
| 2005/0206996 A1* | 9/2005 | Kitamura | G03H 1/08 |
| | | | 359/321 |
| 2008/0057407 A1* | 3/2008 | Kitamura | G03H 1/0808 |
| | | | 430/2 |
| 2020/0264559 A1* | 8/2020 | Sato | G02B 21/12 |

FOREIGN PATENT DOCUMENTS

| | | |
|---|---|---|
| JP | 2010-111072 A | 5/2010 |
| JP | 4525151 B2 | 8/2010 |
| JP | 2013-020084 A | 1/2013 |
| JP | 2014-215362 A | 11/2014 |
| WO | WO-2016/167173 A1 | 10/2016 |
| WO | WO-2017/209113 A1 | 12/2017 |
| WO | WO-2018/097238 A1 | 5/2018 |

OTHER PUBLICATIONS

International Searching Authority, "Written Opinion," issued in connection with International Patent Application No. PCT/JP2019/040513, dated Jan. 7, 2020.

* cited by examiner

| DEMETALLIZATION AMOUNT OF REFLECTIVE LAYER | RECOGNITION RATE | VISIBILITY OF RECONSTRUCTED IMAGE |
|---|---|---|
| 10% | × | ○ |
| 15% | × | ○ |
| 20% | △ | ○ |
| 25% | △ | ○ |
| 30% | ○ | ○ |
| 35% | ○ | ○ |
| 40% | ○ | ○ |
| 45% | ○ | ○ |
| 50% | ○ | ○ |
| 55% | ○ | ○ |
| 60% | ○ | ○ |
| 65% | ○ | ○ |
| 70% | ○ | ○ |
| 75% | ○ | △ |
| 80% | ○ | △ |
| 85% | ○ | △ |
| 90% | ○ | △ |
| 95% | ○ | × |
| 100% | ○ | × |

INTEGRATED THREE DIMENSIONAL DISPLAY AND METHOD OF RECORDING IDENTIFICATION INFORMATION

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/040513, filed on Oct. 15, 2019, which is based upon and claims the benefit of priority to Japanese Patent Application No. 2018-195365, filed on Oct. 16, 2018, the disclosures of which are incorporated herein by reference in their entireties.

TECHNICAL FIELD

Embodiments of the present invention relate to integrated three-dimensional displays in which, for example, phase components of spatial information calculated by a computer are recorded to apply to a hologram, and also relate to methods of recording identification information.

BACKGROUND

As disclosed in the following prior art documents, there have been recently disclosed computer-generated holograms controlled by interference of light calculated by a computer: (PTL 1) JP 4525151 B2; (PTL 2) WO 2018/097238 A1; (PTL 3) WO 2016/167173 A1.

The techniques disclosed in the above patent documents may be applied to, for example, securities, card media, and authentication media. For example, PTL 1 discloses the technique for displaying a full-color three-dimensional image by forming a uneven structure having different periodicities for each wavelength.

Further, PTLs 2 and 3 disclose the technique called a Lippmann hologram, which is a technique for displaying a full-color three-dimensional image by performing multiple recordings of images having different color components for each wavelength on a photosensitive material by using a laser light source.

SUMMARY OF THE INVENTION

However, the technique disclosed in PTL 1 does not consider the parallax in the vertical direction, and is effective only when the parallax is in the horizontal direction. Accordingly, the stereoscopic effect is achieved only in the horizontal direction. In addition, color shift occurs in the vertical direction, which causes iridescence.

This iridescent shift is a typical effect that occurs to most holograms currently commonly used, and leads to commoditization.

Further, Lippmann hologram described in PTLs 2 and 3, which can reconstruct a full-color three-dimensional image, can be usually produced by a known method using an RGB three-color laser and a photosensitive material.

However, the photosensitive materials are expensive compared with embossing holograms that use a general UV-curable resin. Further, Lippmann holograms using an RGB three-color laser require more cycle time than embossing holograms, and are not suitable for mass production.

In addition, when machine-readable codes are added to the photosensitive material, each machine-readable code needs to be individually produced and recorded on the photosensitive material, which is inconvenient.

Embodiments of the present invention have been made in view of the above circumstances, and aim to provide integrated three-dimensional displays, which provide three-dimensional images that can be reconstructed in full-color without causing iridescence and is suitable for mass production, in combination with a machine-readable code, and provide methods of recording identification information.

According to a first aspect of the present invention, an integrated three-dimensional display includes a recording surface on which information for reconstructing a hologram is recorded, the recording surface includes a calculated element region in which phase components of light from light converging points of a holographic reconstructed image are calculated, the calculated element region being defined by one-to-one correspondence to the light converging points, and a phase angle recorded area for recording a phase angle calculated based on the phase components. The phase angle recorded area includes a plurality of monochromatic regions having a uneven structure surface in which protrusion structures and recess structures are alternately arranged at a pitch that is an integral multiple of a predetermined resolution. Further, the phase angle is recorded in an overlap area in which the calculated element region and the phase angle recorded area overlap each other. Light converges on the light converging points at specific distances from the recording surface, the specific distances being determined for the respective light converging points even when light reflected from the plurality of monochromatic regions converges.

According to a second aspect of the present invention, in the integrated three-dimensional display of the first aspect of the present invention, two-dimensional information is provided on the recording surface to overlap at least part of the reconstructed image in a depth direction of the recording surface.

According to a third aspect of the present invention, in the integrated three-dimensional display of the second aspect of the present invention, the two-dimensional information is provided on the recording surface and does not cover an entire surface of the phase angle recorded area.

According to a fourth aspect of the present invention, in the integrated three-dimensional display of the second aspect of the present invention, at least one of the reconstructed image and the two-dimensional information includes personal identification information.

According to a fifth aspect of the present invention, in the integrated three-dimensional display of the second aspect of the present invention, at least one of a shape of the monochromatic regions on the recording surface, a shape of the two-dimensional information, and a shape of the reconstructed image represents a character or a mark.

According to a sixth aspect of the present invention, in the integrated three-dimensional display of the second aspect of the present invention, at least one of a shape of the monochromatic regions on the recording surface, a shape of the two-dimensional information, and a shape of the reconstructed image represents a machine-readable code.

According to a seventh aspect of the present invention, in the integrated three-dimensional display of the first aspect of the present invention, the recording surface further includes a phase angle non-recorded area that does not record a phase angle, and the phase angle non-recorded area in the calculated element region has a mirror surface.

According to an eighth aspect of the present invention, in the integrated three-dimensional display of the first aspect of the present invention, the recording surface further includes a phase angle non-recorded area that does not record a phase angle, and the phase angle non-recorded area in the calculated element region records information other than the phase angle.

According to a ninth aspect of the present invention, in the integrated three-dimensional display of the eighth aspect of the present invention, the information other than the phase angle is information including at least one of scattering, reflection, and diffraction of light.

According to a tenth aspect of the present invention, in the integrated three-dimensional display of the first aspect of the present invention, the phase angle is calculated as $\varphi$ according to the following formula.

$$W(kx, ky) = \sum_{n=0}^{Nmax} \sum_{ky=Ymin}^{Ymax} \sum_{kx=Xmin}^{Xmax} amp \cdot \exp(i\phi) \quad \text{[Math. 1]}$$

$$\phi = \frac{\pi}{\lambda \cdot O_n(z)} \{(O_n(x) - kx)^2 + (O_n(y) - ky)^2\}$$

In the formula, (kx, ky) are coordinates of a pixel that constitute the monochromatic regions, W (kx, ky) represents the phase components of the coordinates (kx, ky), n is an index of the plurality of the light converging points Sn (n=0 to Nmax), amp is an amplitude of light at the light converging points Sn, i is an imaginary number, $\lambda$ is a wavelength of light in reconstruction of the reconstructed image, On (x, y, z) represents coordinates of the light converging points Sn, and Xmin, Xmax, Ymin, and Ymax are coordinates indicating a range of the calculated element region defined for the respective light converging points.

According to an eleventh aspect of the present invention, in the integrated three-dimensional display of the first aspect of the present invention, the number of types of the monochromatic regions corresponds to a number of colors required to reconstruct the hologram, a color of reflected light reflected from the monochromatic regions is one of the colors required to reconstruct the hologram, a depth of the recess structures in each of the monochromatic regions is determined depending on the color of reflected light, and the determined depth of the recess structures is recorded in the monochromatic regions in the overlap area instead of the phase angle being recorded in the overlap area.

According to a twelfth aspect of the present invention, in the integrated three-dimensional display of the first aspect of the present invention, a void is embedded in the overlap area instead of the phase angle being recorded in the overlap area, the void having a void size modulated according to the phase angle.

According to a thirteenth aspect of the present invention, in the integrated three-dimensional display of the first aspect of the present invention, the integrated three-dimensional display includes a plurality of the calculated element regions, wherein, among the plurality of calculated element regions, the respective calculated element regions positioned on the recording surface without overlapping other calculated element regions are colored in different colors from other calculated element regions.

According to a fourteenth aspect of the present invention, in the integrated three-dimensional display of the first aspect of the present invention, the recording surface includes a metallic reflective layer.

According to a fifteenth aspect of the present invention, in the integrated three-dimensional display of the first aspect of the present invention, the integrated three-dimensional display is attached to an object.

According to a sixteenth aspect of the present invention, in the integrated three-dimensional display of the first aspect of the present invention, a distance between the recording surface and each of the light converging points is in a range of 0.5 (mm) or more and 50 (mm) or less, and the integrated three-dimensional display is designed to be observed in an angular range of 0(°) or more and 70(°) or less relative to a direction normal to the recording surface.

According to a seventeenth aspect of the present invention, a method of recording identification information includes demetallizing the metallic reflective layer corresponding to identification information to thereby record the identification information on the integrated three-dimensional display of the fourteenth aspect.

According to an eighteenth aspect the present invention, in the method of recording identification information of the seventeenth aspect of the present invention, the identification information is a machine-readable code, and the demetallizing includes demetallizing 30(%) or more and 70(%) or less of a metal of a portion of the metallic reflective layer which is desired to be non-reflective in order to produce the machine-readable code by combining reflection and non-reflection.

According to a nineteenth aspect of the present invention, a method of recording identification information includes providing a print layer on the recording surface; and recording identification information on the print layer to thereby record the identification information on the integrated three-dimensional display of the first aspect.

According to the integrated three-dimensional display of the first aspect of the present invention, in which the calculated element region is provided, it is possible to reduce computation time by a computer, reduce the noise of spatial information, and obtain a clear hologram.

In the calculation, in particular, the phase angle can be calculated and recorded. Such a phase hologram can modulate only the phase components of light while achieving high diffraction efficiency. Thus, light can be controlled while the brightness of light being kept high.

Further, computation time by a computer can be further reduced by limiting the phase angle recorded area for recording the phase angle within the calculated element region. In addition, the percentage of light illuminating the integrated three-dimensional display can also be controlled.

Further, when a portion of the calculated element region other than the phase angle recorded area is defined as a phase angle non-recorded area, the reconstructed image reconstructed at the light converging points can have a brightness lower than that in a case where no phase angle non-recorded area is provided by the amount represented by (phase angle recorded area)/(phase angle recorded area+phase angle non-recorded area). Thus, the brightness of reflected light can be controlled.

Moreover, the three-dimensional reconstructed image can be reconstructed only when the phase angle recorded area is illuminated with light. That is, the larger the phase angle recorded area, the brighter the reconstructed image, and the smaller the phase angle recorded area, the darker the reconstructed image. However, although capable of reconstructing only a dark reconstructed image, the phase angle non-recorded area can be used as another optical element.

Furthermore, when the phase angle recorded area being composed of one or a plurality of monochromatic regions, a monochromatic or color image can be three-dimensionally reconstructed.

According to the integrated three-dimensional display of the second aspect of the present invention, in which the two-dimensional information is provided on the recording surface to overlap at least part of the reconstructed image in a depth direction of the recording surface, anti-counterfeiting properties can be greatly enhanced.

If a reconstructed image and two-dimensional information are simply provided and separated from each other on the recording surface, two-dimensional information can be counterfeited by changing only the genuine original two-dimensional information. In this case, the genuine reconstructed image can be easily combined with counterfeited two-dimensional information, increasing a risk of counterfeiting being easily performed. Accordingly, anti-counterfeiting properties are lowered. Further, if a three-dimensional reconstructed image and two-dimensional information are separately provided in two layers, one of the layers which includes genuine two-dimensional information can be easily replaced with a layer having counterfeited two-dimensional information, which leads to a risk of counterfeiting being easily performed. Accordingly, anti-counterfeiting properties are lowered. However, according to the integrated three-dimensional display of this aspect of the invention, these problems can be solved.

According to the integrated three-dimensional display of the third aspect of the present invention, the two-dimensional information is provided on the recording surface and does not cover an entire surface of the phase angle recorded area. If the entire surface of the phase angle recorded area which corresponds to one light converging point is covered with two-dimensional information, a light converging point to be reconstructed from the phase angle recorded area will not appear. However, according to the integrated three-dimensional display of this aspect of the invention, since the two-dimensional information is provided not to cover the entire surface of the phase angle recorded area, the light converging point to be reconstructed from the phase angle recorded area can be prevented from disappearing.

According to the integrated three-dimensional display of the fourth aspect of the present invention, at least one of the reconstructed image and the two-dimensional information can be used as personal identification information.

According to the integrated three-dimensional display of the fifth aspect of the present invention, a dynamic three-dimensional reconstructed image and a static two-dimensional information such as a character or a mark can be displayed in combination. Accordingly, anti-counterfeiting properties of the two-dimensional information can be enhanced.

According to the integrated three-dimensional display of the sixth aspect of the present invention, at least one of a shape of the monochromatic regions on the recording surface, a shape of the two-dimensional information, and a shape of the reconstructed image represents a machine-readable code. Accordingly, a variable code having enhanced anti-counterfeiting properties can be provided. The machine-readable code may be a two-dimensional code or a one-dimensional code. The machine-readable code may be a QR code (registered trademark), a barcode, a data matrix, or the like.

According to the integrated three-dimensional display of the seventh aspect of the present invention, the phase angle non-recorded area in the calculated element region on the recording surface can have a mirror surface.

According to the integrated three-dimensional display of the eighth aspect of the present invention, information other than a phase angle is recorded in the phase angle non-recorded area in the calculated element region. Accordingly, information other than the phase components of light of the three-dimensional reconstructed image can be controlled by the phase angle non-recorded area.

According to the integrated three-dimensional display of the ninth aspect of the present invention, information other than a phase angle is information including at least one of scattering, reflection, and diffraction of light. Accordingly, various types of light can be controlled by using different types of light effects to thereby achieve a complicated visual effect.

According to the integrated three-dimensional display of the tenth aspect of the present invention, a phase angle of coordinates of a pixel that constitutes the monochromatic regions can be specifically calculated according to the following formula.

$$W(kx, ky) = \sum_{n=0}^{Nmax} \sum_{ky=Ymin}^{Ymax} \sum_{kx=Xmin}^{Xmax} amp \cdot \exp(i\phi) \quad \text{[Math. 2]}$$

$$\phi = \frac{\pi}{\lambda \cdot O_n(z)}\{(O_n(x) - kx)^2 + (O_n(y) - ky)^2\}$$

According to the integrated three-dimensional display of the eleventh aspect of the present invention, the depth of the recess structures of the monochromatic region according to the phase angle, instead of the phase angle, can be recorded in the overlap area.

According to the integrated three-dimensional display of the twelfth aspect of the present invention, a void having a void size modulated according to the phase angle can be embedded in the overlap area instead of the phase angle being recorded in the overlap area.

According to the integrated three-dimensional display of the thirteenth aspect of the present invention, the respective calculated element regions positioned on the recording surface without overlapping other calculated element regions can be colored in different colors to thereby reconstruct a full-color three-dimensional reconstructed image.

According to the integrated three-dimensional display of the fourteenth aspect of the present invention, the recording surface includes a metallic reflective layer. Accordingly, the reflection efficiency of light can be improved so that a bright reconstructed image can be reconstructed due to the reflected light.

According to the integrated three-dimensional display of the fifteenth aspect of the present invention, the integrated three-dimensional display can be attached to an object.

According to the integrated three-dimensional display of the sixteenth aspect of the present invention, although the reconstructed image may be blurred and not clearly visible depending on the size and number of illumination sources such as fluorescent lamps in a typical office environment or the like, the reconstructed image may be clearly visible when illuminated with an LED, which is a point light source, or a light source of a smartphone or a cash register reader.

According to the method of recording identification information of the seventeenth aspect of the present invention, a portion of the metallic reflective layer which is desired to be non-reflective can be demetallized by using a laser to record identification information.

According to the method of recording identification information of the eighteenth aspect of the present invention, a portion of the metallic reflective layer which is desired to be non-reflective can be demetallized to record two-dimensional information. As the demetallization amount increases, the contrast of the two-dimensional information increases. This facilitates recognition of the two-dimensional information and increases the recognition rate per unit time, but decreases the brightness of the three-dimensional reconstructed image. In contrast, as the demetallization amount decreases, the three-dimensional reconstructed image has an increased brightness. However, the contrast of the machine-readable two-dimensional information decreases, and the recognition rate decreases accordingly. According to the method of recording identification information of the eighteenth aspect of the present invention, 30(%) or more and 70(%) or less of a metal of a portion of the metallic reflective layer which is desired to be non-reflective can be demetallized to achieve both easily recognizable two-dimensional information and a bright reconstructed image.

According to the method of recording identification information of the nineteenth aspect of the present invention, a print layer can be provided on the recording surface, and identification information can be recorded on the print layer. Accordingly, the phase angle recorded area on the recording surface can be partially shielded, and the shielded region can be effectively used for recording two-dimensional information.

DETAILED DESCRIPTION

Embodiments of the present invention of will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

With reference to the accompanying drawings, some embodiments of the present invention will be described.

Figure 1:
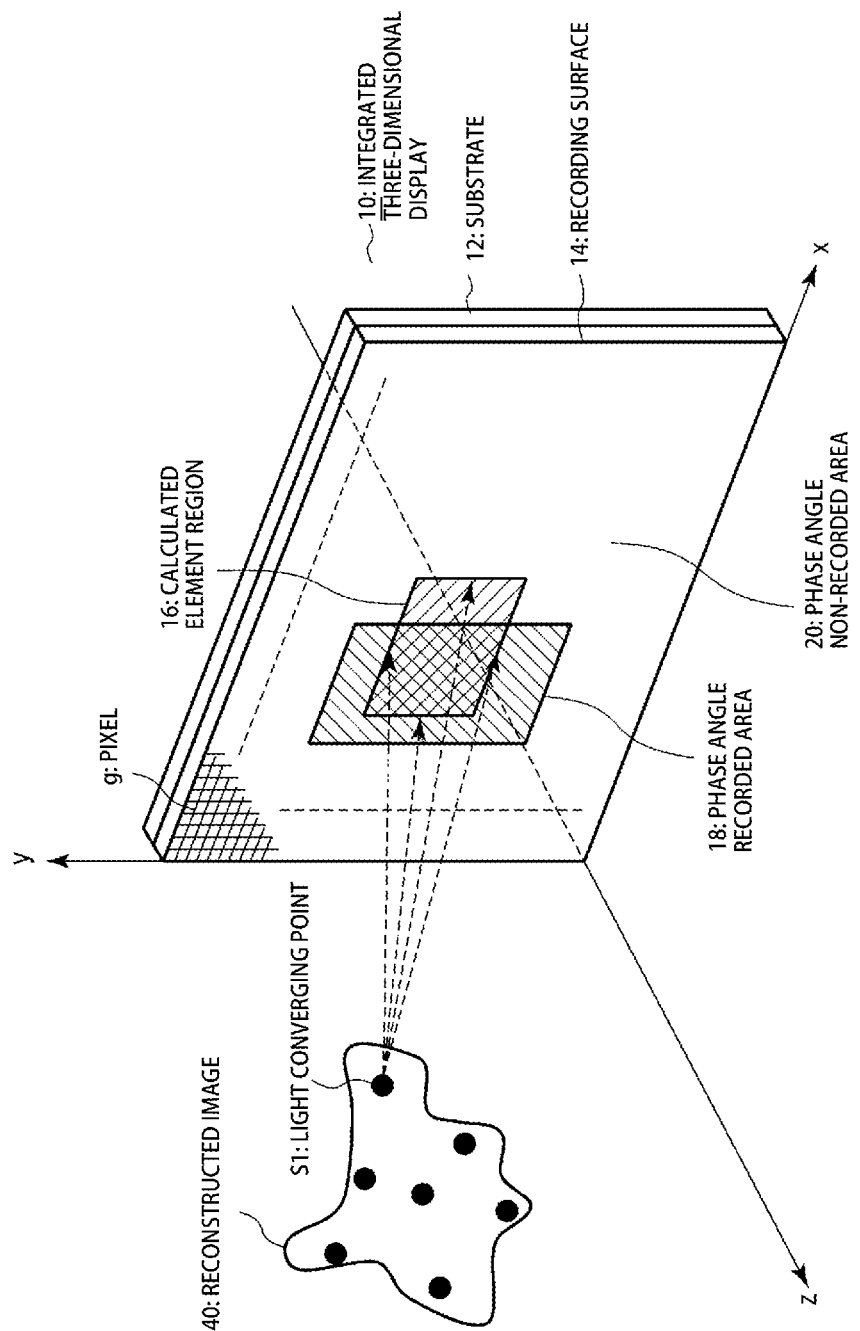
FIG. 1 is a conceptual diagram illustrating an integrated three-dimensional display to which a method of recording identification information according to an embodiment of the present invention is applied.

FIG. 1 is a conceptual diagram illustrating an integrated three-dimensional display to which a method of recording identification information according to an embodiment of the present invention is applied An integrated three-dimensional display 10 to which a method of recording identification information according to an embodiment of the present invention is applied includes a substrate 12 parallel to an xy plane shown in FIG. 1, and a recording surface 14 provided on the substrate 12. A multiple pixels g are arrayed in a matrix on the recording surface 14. Each pixel g can have a square shape with a side length p of a minimum resolution of an electron beam lithography apparatus (possible range is 100 to 500 (nm)). Further, each pixel g may have a rectangular shape, and the corners thereof may be rounded.

The recording surface 14 includes a calculated element region 16, a phase angle recorded area 18, and a phase angle non-recorded area 20. The recording surface 14 can be covered with a metallic reflective layer.

The calculated element region 16 is a region defined by one-to-one correspondence to light converging points Sn (n is a positive integer) of a holographic reconstructed image 40, in which phase components of light from the respective light converging points Sn are calculated. The holographic reconstructed image 40 can be visible. The wavelength of light reconstructing the hologram can be in a range of 470 (nm) or more and 750 (nm) or less. The integrated three-dimensional display 10 enables reading of three-dimensional information in the visible range. A solid-state imaging camera can be used to read three-dimensional information. The solid-state imaging camera may be a CCD camera or a CMOS camera. Further, the integrated three-dimensional display 10 enables reading of three-dimensional information in the infrared range or ultraviolet range. An infrared camera can be used to read three-dimensional information. The infrared camera may be a solid-state imaging camera. When an ultraviolet lamp such as a black light is used for illumination so that ultraviolet light is converted into visible light or infrared light by fluorescent materials, the three-dimensional information can be read in the ultraviolet range by using a solid-state imaging camera.

The phase angle recorded area 18 is a region for recording a phase angle calculated based on the phase components of light from each light converging point Sn and a pixel depth according to the phase angle. The above information is recorded in an overlap area in which the phase angle recorded area 18 overlaps the calculated element region 16.

On the other hand, the phase angle non-recorded area 20 is a region in which information recorded in the phase angle recorded area 18 is not recorded. That is, a phase angle calculated based on phase components of light from each light converging point Sn and a pixel depth according to the phase angle are not recorded in the phase angle non-recorded area 20. However, other information such as scattering, reflection, diffraction and other properties of light can be recorded in the phase angle non-recorded area 20. The phase angle non-recorded area 20 can have a mirror surface.

A phase angle $\varphi$ can be calculated according to the following formula.

$$W(kx, ky) = \sum_{n=0}^{Nmax} \sum_{ky=Ymin}^{Ymax} \sum_{kx=Xmin}^{Xmax} amp \cdot \exp(i\phi) \quad \text{[Math. 3]}$$

$$\phi = \frac{\pi}{\lambda \cdot O_n(z)} \{(O_n(x) - kx)^2 + (O_n(y) - ky)^2\}$$

In the above formula, (kx, ky) are coordinates of the pixel g, W (kx, ky) represents phase components of the coordinates (kx, ky), n is an index of light converging points Sn (n=0 to Nmax), amp is the amplitude of light at the light converging points Sn, i is the imaginary number, λ is a wavelength of light in reconstruction of the reconstructed image 40, On (x, y, z) represents coordinates of the light converging points Sn, and Xmin, Xmax, Ymin, and Ymax are coordinates indicating the range of the calculated element region 16 defined for the respective light converging points Sn.

The phase angle φ obtained according to the above formula is recorded in the corresponding pixel g in the overlap area of the phase angle recorded area 18 which overlaps the calculated element region 16.

Further, the phase angle φ can be recorded in the corresponding pixel g in the overlap area as the depth of the pixel g according to the phase angle φ. In this case, the phase angle φ is converted into a depth of the pixel g. This is performed by a computer calculating the phase angle φ in the range of 0π to 2π, and converting the resultant value into an 8-bit grayscale value in order to output the calculation results. In this case, 2π corresponds to the level 255 of 8-bit grayscale values. Then, based on the results of the calculation, an image is drawn on a resist substrate with an electron beam lithography apparatus.

If the electron beam lithography apparatus is not compatible with multi-level drawing, drawing similar to multi-level drawing is performed by drawing an image multiple times at the same position with different power outputs. Drawing three times can achieve an appearance corresponding to multi-level drawing having eight levels. Then, the resist is developed to obtain a substrate having a uneven structure. The substrate having a uneven structure is subjected to electrocasting to obtain a stamper. In drawing on the resist substrate, the phase angle can be recorded by four or eight-level drawing. Specifically, the uneven structure of the monochromatic region 22 can have two levels.

In order to change the color by the depth of the pixel g, drawing two levels at the same time is necessary. In this case, drawing can be performed by binarizing the gray scale which is a design value. That is, the concave portions of the uneven structure of the monochromatic region 22 have a constant depth. Further, the protrusion portions of the uneven structure of the monochromatic region 22 have a constant height.

The depth of the pixel g which forms a recess can be controlled by modulating the dose of the electron beam. The depth of drawing on the resist substrate changes with the dose. Thus, the recess of the depth of the pixel g on the recording surface 14 can be recorded.

The above stamper is used to form a uneven structure on a thermoplastic resin, heat-curable resin, UV resin, or the like in the pixels g in the overlap area, which is provided facing the resist substrate. Thus, the uneven structure of an embossed layer can be formed by embossing with the stamper. The embossing can be hot embossing. Ultraviolet radiation can be applied either during or after embossing, or both during and after embossing. The stamper may be heated or cooled during embossing. Thus, the depth of the pixels g according to the phase angle φ can be recorded in the pixels g in the overlap area.

Figure 2:
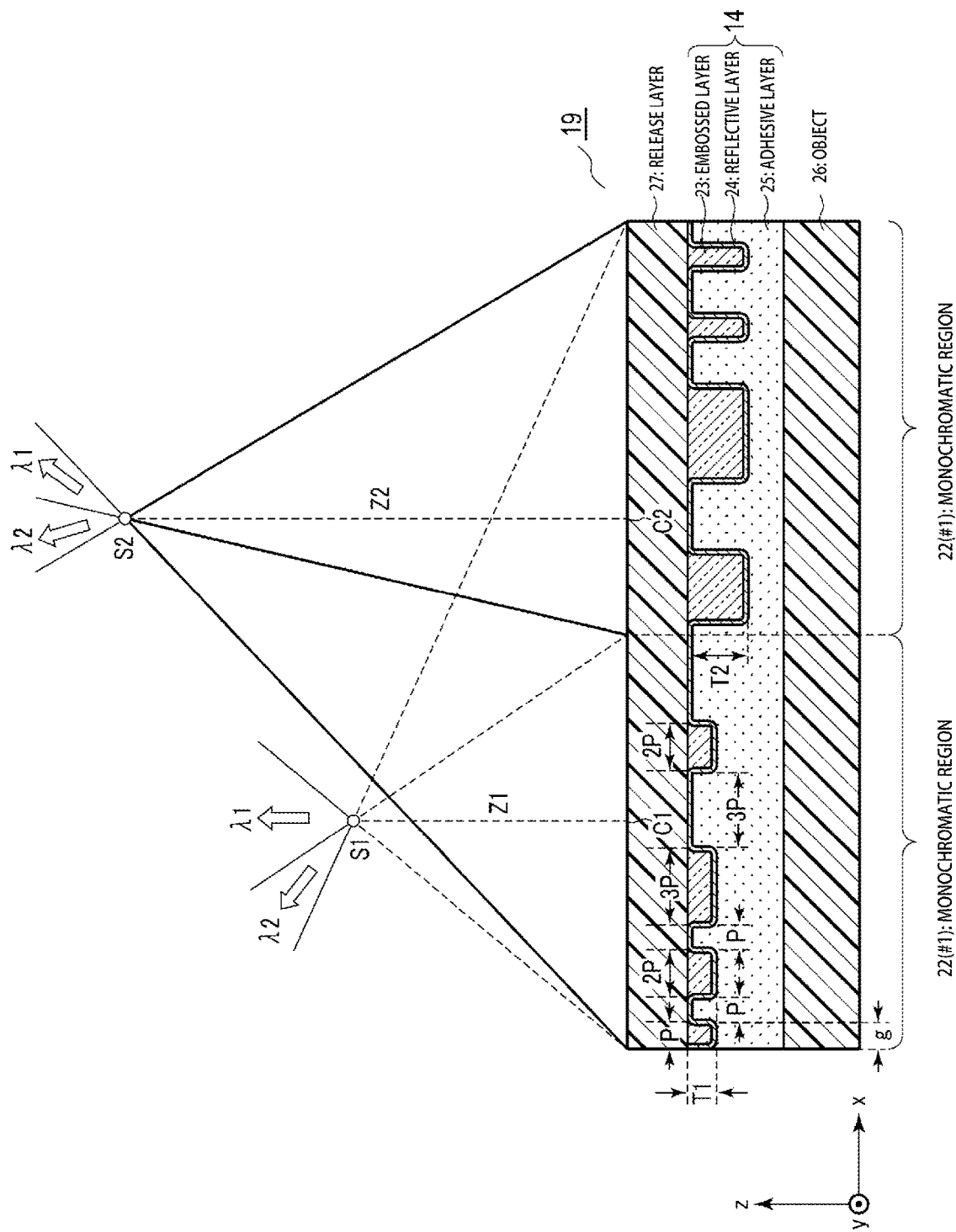
FIG. 2 is a cross-sectional view illustrating a portion of an overlap area in which a depth of a pixel according to a phase angle is recorded.

FIG. 2 is a cross-sectional view illustrating a portion of the overlap area in which a depth of a pixel according to a phase angle is recorded.

FIG. 2 illustrates an example cross-sectional configuration of the overlap area 19, in which a release layer 27, an embossed layer 23, a reflective layer 24, and an adhesive layer 25 are laminated in this order from the upper side in the drawing. Among these layers, the embossed layer 23 and the reflective layer 24 correspond to the recording surface 14. The substrate 12 is not shown in the figure. The depth of the pixel g in the embossed layer 23 corresponds to the phase angle cp. The adhesive layer 25 can fix the integrated three-dimensional display 10 to an object 26, and the release layer 27 can protect a surface of the embossed layer 23. In this configuration, an interface between the embossed layer 23 and the reflective layer 24 corresponds to the recording surface 14.

The overlap area 19 includes one or more monochromatic regions 22, each composed of a group of pixels g, extending parallel to the xy plane. Further, the embossed layer 23 in the same monochromatic region 22 has a constant depth T. That is, in FIG. 2, which illustrates two monochromatic regions 22 (#1) and (#2), the pixels g of the embossed layer 23 in the monochromatic region 22(#1) have a depth T1, whereas the pixels g in the embossed layer 23 of the monochromatic region 22 (#2) have a depth T2 larger than the depth T1 (T2>T1). The pixels g of the embossed layer 23 are arrayed in the x and y directions such that the concave portions and protrusion portions are alternately arranged at a pitch that is an integral multiple of a side length p of the pixel g (p, 2p, 3p, . . . ).

The reflective layer 24 made of a metal or a metal compound is disposed between the embossed layer 23 and the adhesive layer 25, and a surface of the embossed layer 23 opposite to that facing the adhesive layer 25 is covered with the release layer 27. The metal of the reflective layer 24 can be aluminum, silver, gold or the like. The metal of the reflective layer 24 can be a metal sulfide, a metal oxide, a metal nitride, or the like. The metal sulfide can be zinc sulfide or the like. The metal oxide can be alumina, titanium oxide, or the like. The metal nitride can be calcium nitride, aluminum nitride, or the like. Since the metallic reflective layer easily absorbs laser light, it is suitable for laser engraving.

The type of the monochromatic region 22 is determined depending on the depth T of the pixels g of the embossed layer 23. Although the example shown in FIG. 2 includes only two types of monochromatic regions 22, or the monochromatic region 22 (#1) in which the pixels g have the depth T1 and the monochromatic region 22 (#2) in which the pixels g have the depth T2, the number of types of the monochromatic regions 22 in the integrated three-dimensional display 10 is equal to the number of colors required to reconstruct the reconstructed image 40. When the three colors of RGB are applied to reconstruct the reconstructed image 40, three monochromatic regions 22 in which the respective embossed layers 23 have different depths T can be provided as the monochromatic regions 22 corresponding to the three colors of RGB. The depth of the pixels g can be in the range of 78 (nm) or more and 250 (nm) or less. This applies to the case where the visible light from blue to red ranges from 470 (nm) to 750 (nm), the embossed layer 23 has a refractive index of 1.5, and the required depth of the structure is from ¼λ to ½λ.

In the example shown in FIG. 2, the pixel g of the embossed layer 23 in the monochromatic region 22 (#1) has a depth T1 that reflects light of a center wavelength and the pixel g of the embossed layer 23 in the monochromatic region 22 (#2) has a depth T2 that reflects light of a center wavelength λ2.

Further, although the example shown in FIG. 2 includes only two adjacent monochromatic regions 22 (#1) and (#2), a plurality of the same type of monochromatic regions 22 can be provided parallel to the xy plane in the overlap area 19. The monochromatic regions 22 can be arranged adjacent to each other. Further, the adjacent monochromatic regions 22 can be formed on the recording surface 14 as an integrated unit.

Thus, the depth T according to the phase angle φ calculated at the coordinates of each pixel g can be recorded in the pixel g constituting the monochromatic region 22.

Further, the pixels g are disposed to form a zone plate around a point C1 in monochromatic region 22 (#1), and the pixels g are disposed to form a zone plate around a point C2 in the monochromatic region 22 (#2).

The point C1 is an intersection between a line from the light converging point S1 perpendicular to the recording surface 14 and a surface of the recording surface 14. Similarly, the point C2 is an intersection between a line from the light converging point S2 perpendicular to the recording surface 14 and a surface of the recording surface 14. The line from the light converging point S1 perpendicular to a surface of the recording surface 14 has a length Z1, and the line from the light converging point S2 perpendicular to a surface of the recording surface 14 has a length Z2.

In addition, the pixels g are disposed to form a zone plate around a point C2 in monochromatic region 22 (#1), and the pixels g are disposed to form a zone plate around a point C1 in the monochromatic region 22 (#2). In other words, the monochromatic region 22 (#1) and the monochromatic region 22 (#2) are arrayed in a phase-continuous manner. The spatial frequencies of the zone plate increase from the center toward the periphery. The spatial frequencies affect the wavelength of reflected light converging on the light converging point S of the monochromatic region 22. Particularly, in a region of the zone plate having too high spatial frequencies, diffraction causes significant influence. Accordingly, in view of reducing this influence, the spatial frequencies of the zone plate can be 500 (lp/mm) or less.

With this configuration, even when light reflected from different monochromatic regions 22 converges on the respective light converging points at specific distances Zn from the recording surface 14, which are determined for each of the light converging points. All the distances Zn (n is a natural number) can be in the range of 0.5 (mm) or more and 50 (mm) or less. The reason for this is that, when white light is used for reconstruction, the reconstruction distance is not too great, so the colors of image are not separated into RGB, preventing deterioration in image quality due to color separation. Further, since a three-dimensional image can be distinguished from a planar image, the image can be recognized as a three-dimensional image.

Moreover, the reflective layer 24 can be partially removed to record a mark, a shape, a code, or the like. A laser used for the above recording may be an infrared laser. The beam emitted from the infrared laser onto the reflective layer 24 can apply heat energy required to remove the reflective layer 24. The infrared laser can be a solid-state laser. As the solid-state laser, a general YAG laser can be used. A YAG laser has a fundamental wavelength of 1064 (nm). Further, when the embossed layer 23 is a polymer, it typically has a refractive index of approximately 1.5. Therefore, assuming that the refractive index of the embossed layer 23 is 1.5, the wavelength in the embossed layer 23 is 709 (nm). When light is perpendicularly incident on the embossed layer 23, the reflection of light is maximized under the condition that the pixel has a depth of 354 (nm), which is half the wavelength of the laser in the embossed layer 23. On the other hand, when the structure has a depth of 177 (nm), reflection of light is minimized.

Therefore, when the structure has a depth of 89 (nm) or more and 266 (nm) or less, laser light is easily absorbed. Within this range, the reflective layer 24 can be partially removed under the same engraving condition even if the structure is different. Further, the pixel depth in view of the requirement for reconstruction of a visible hologram is 78 (nm) or more and 250 (nm) or less, and the pixel depth in view of the requirement for engraving is 89 (nm) or more and 266 (nm) or less. Accordingly, both requirements can be satisfied when the depth is 89 (nm) or more and 250 (nm) or less.

As described above, the integrated three-dimensional display 10 enables reconstruction of a visible hologram, and recording of two-dimensional information on the reflective layer 24 by a laser. Further, when the structure has a depth or height of 350 (nm) or more, embossing becomes difficult.

As described above, light reflected on the plurality of monochromatic regions 22 converges on the respective specific light converging points S1, S2, . . . Sn. FIG. 2 illustrates that propagation light which is light reflected from the monochromatic region 22 (#1) and propagation light which is light reflected from the monochromatic region 22 (#2) both converge on the light converging points S1 and S2. That is, in the example of FIG. 2, the propagation light from the plurality of monochromatic regions 22 (#1 and #2) converges on the light converging point S1 common to the plurality of monochromatic regions 22 (#1 and #2). Similarly, the propagation light from the plurality of monochromatic regions 22 (#1 and #2) converges on the light converging point S2 common to the plurality of monochromatic regions 22 (#1 and #2). That is, the propagation light is directed from the reflective layer 24 and converges on the light converging points S, which are separated from each other.

Figure 3:
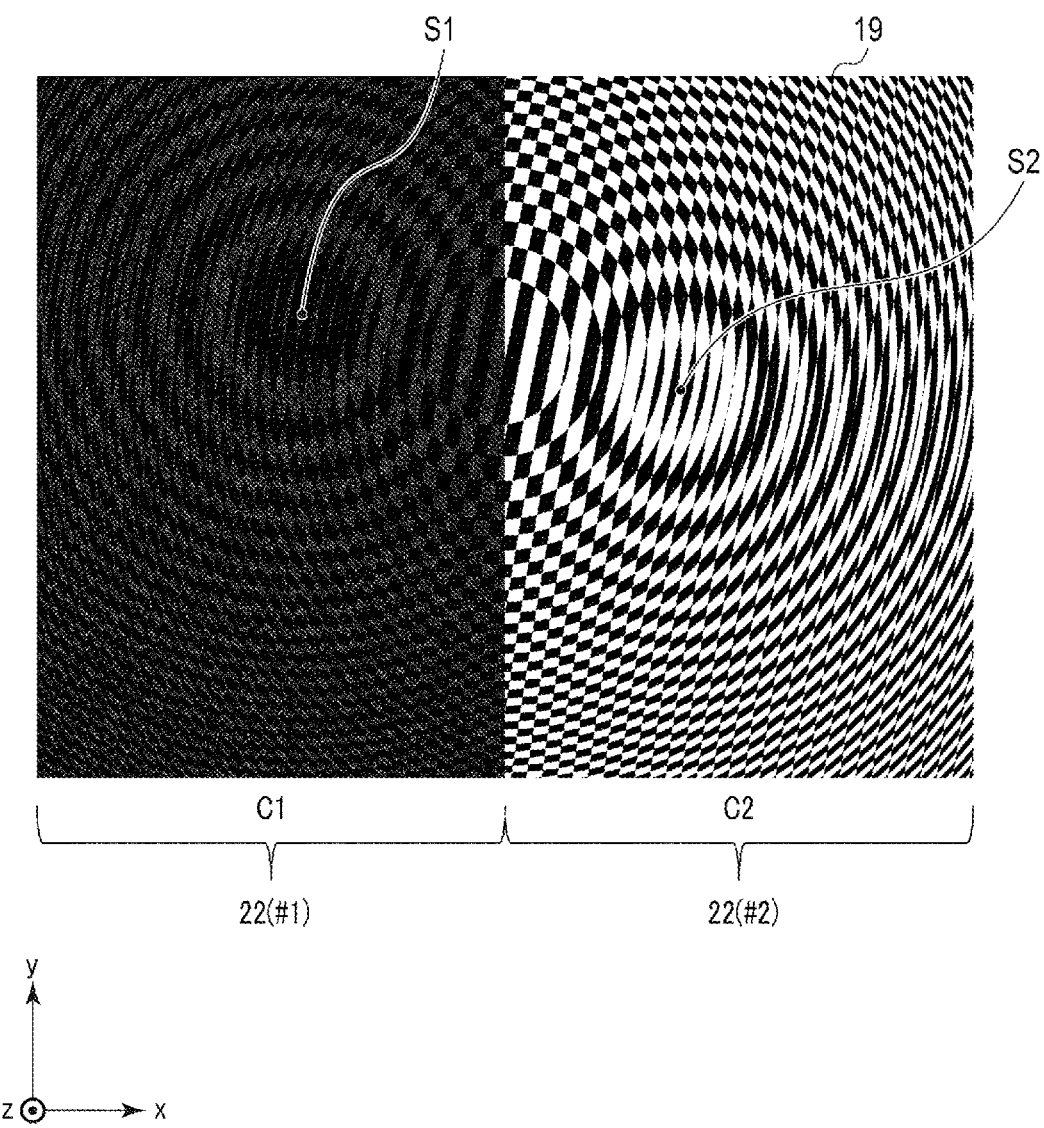
FIG. 3 is a front view of a reconstructed image produced by an integrated three-dimensional display which includes an overlap area having an example configuration shown in FIG. 2.

FIG. 3 is a front view of a reconstructed image produced by an integrated three-dimensional display which includes an overlap area having an example configuration shown in FIG. 2 viewed from above (in the Z direction).

The figure shows that light reflected from the monochromatic regions 22 (#1) and (#2) respectively converges on the light converging points S1 and S2.

Next, a principle of full-color display achieved by an integrated three-dimensional display according to an embodiment of the present invention will be described.

Figure 4:
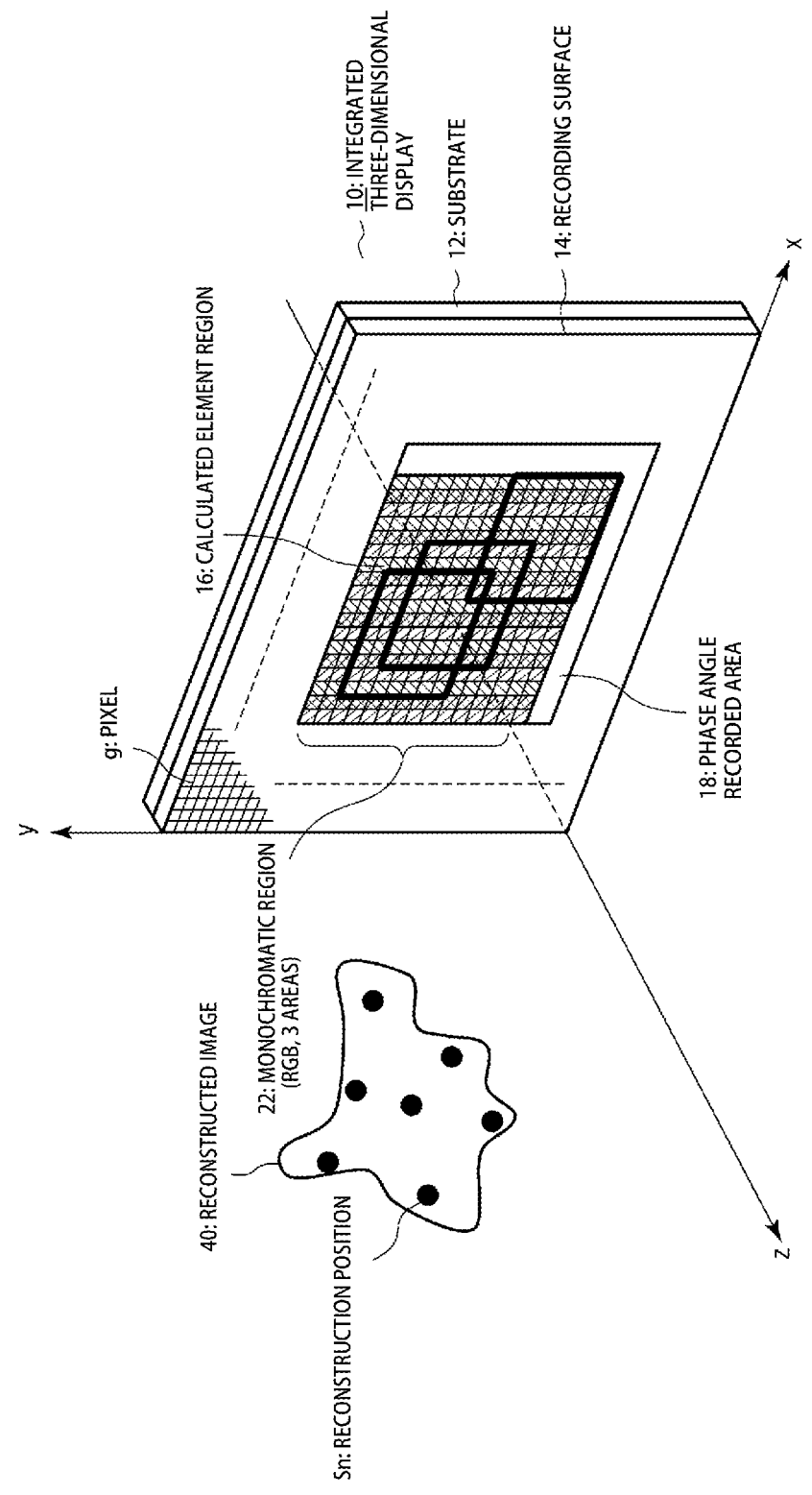
FIG. 4 is a conceptual diagram illustrating a principle of full-color display achieved by an integrated three-dimensional display according to an embodiment of the present invention.

FIG. 4 is a conceptual diagram illustrating a principle of full-color display achieved by an integrated three-dimensional display according to an embodiment of the present invention.

As described above, the number of types of the monochromatic regions 22 in the integrated three-dimensional display 10 is equal to the number of colors required to reconstruct the reconstructed image 40. In addition, the number and arrangement of the monochromatic regions 22 in the integrated three-dimensional display 10 can be changed according to the mark or machine-readable code to be represented.

Figure 5A:
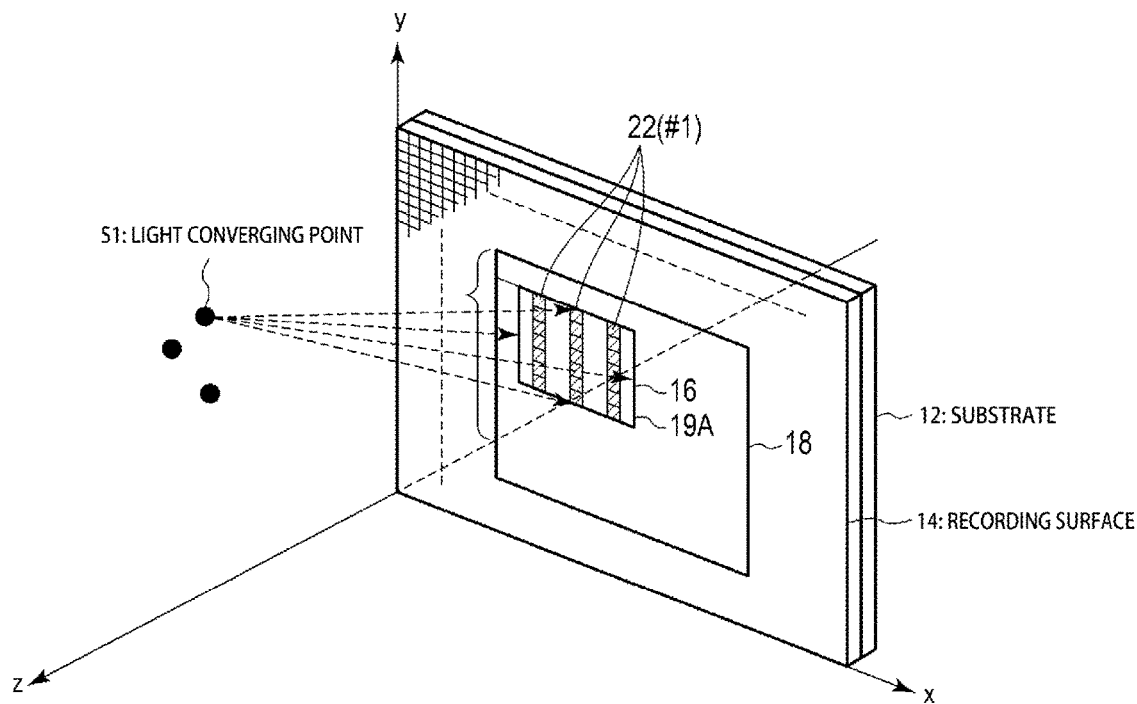
FIG. 5A is a conceptual diagram illustrating an example arrangement of a monochromatic region that causes a light converging point to emit red light.
Figure 5B:
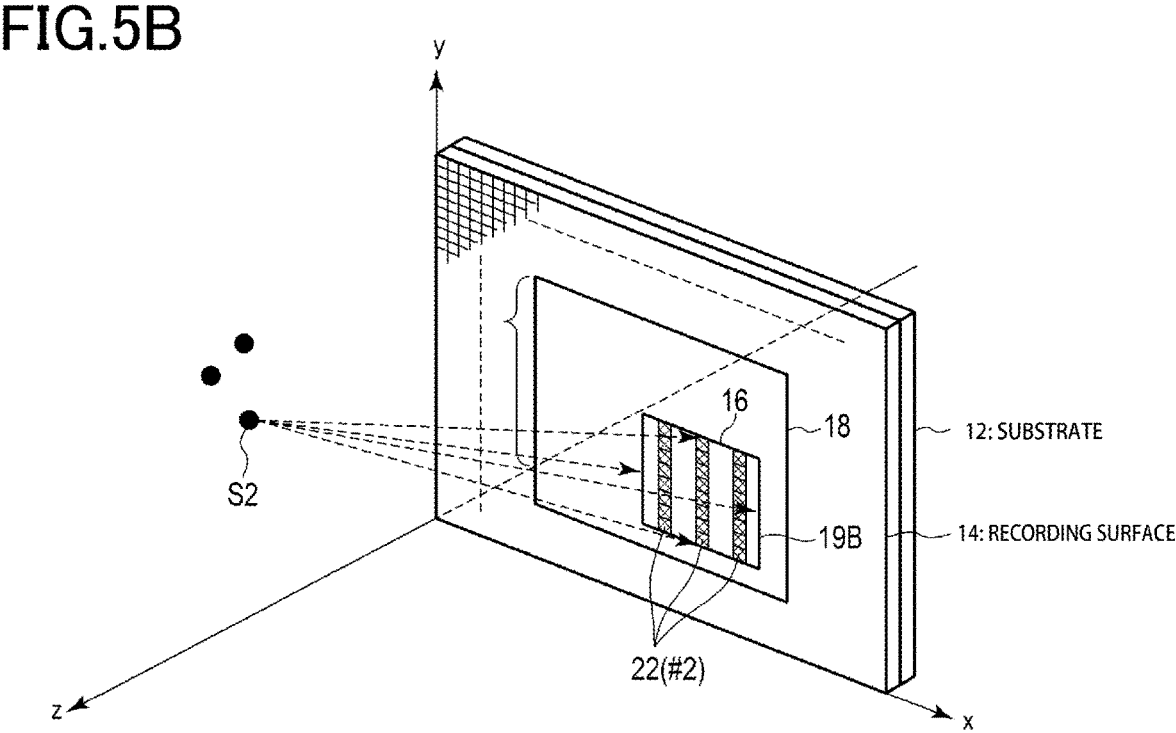
FIG. 5B is a conceptual diagram illustrating an example arrangement of a monochromatic region that causes a light converging point to emit blue light.
Figure 5C:
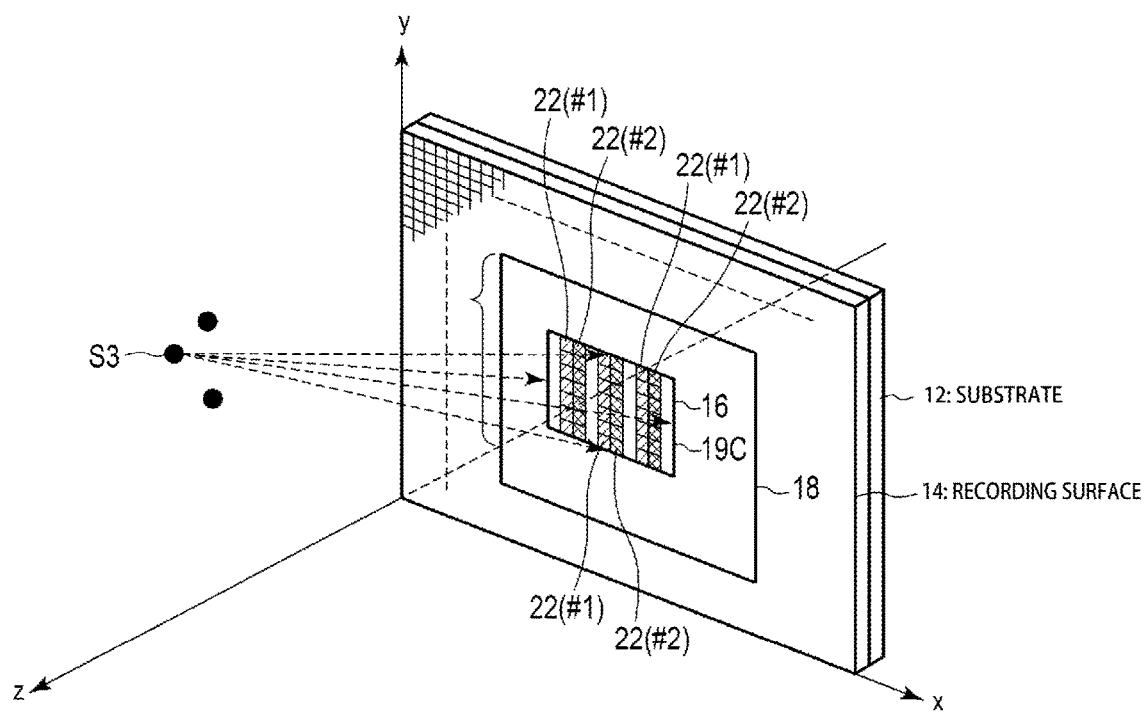
FIG. 5C is a conceptual diagram illustrating an example arrangement of a monochromatic region that causes a light converging point to emit violet light.

The colors required to reconstruct the reconstructed image 40 can be the three RGB colors, and the monochromatic regions 22 can be of a size that is not recognizable by human eyes. The size that is not recognizable by human eyes can be 100 (μm) or less. When the monochromatic regions 22 having such a size are arranged in the xy plane, white is observed under diffuse illumination, whereas the three-dimensional reconstructed image 40 can be reconstructed in full color by the respective colors of light converging points Sn under a point light source. With reference to FIGS. 5A, 5B, and 5C, example arrangements of the monochromatic regions 22 in the overlap area 19 will be described.

FIG. 5A is a conceptual diagram illustrating an example arrangement of a monochromatic region that causes the light converging point S1 to emit red light.

FIG. 5B is a conceptual diagram illustrating an example arrangement of a monochromatic region that causes the light converging point S2 to emit blue light.

FIG. 5C is a conceptual diagram illustrating an example arrangement of a monochromatic region that causes the light converging point S3 to emit violet light.

As shown in FIG. 5A, in order to cause the light converging point S1 to emit red light, only the monochromatic regions 22 (#1) that reflect red light are disposed in an overlap area 19A in which the calculated element region 16 defined by the light converging points S1 overlaps the phase angle recorded area 18.

As shown in FIG. 5B, in order to cause the light converging point S2 to emit blue light, only the monochromatic regions 22 (#2) that reflect blue light are disposed in an overlap area 19B in which the calculated element region 16 defined by the light converging points S2 overlaps the phase angle recorded area 18.

On the other hand, violet is a color obtained by mixing red and blue. Accordingly, as shown in FIG. 5C, in order to cause the light converging point S3 to emit violet light, the monochromatic regions 22 (#1) that reflect red light and the monochromatic regions 22 (#2) that reflect blue light are disposed in an overlap area 19C in which the calculated element region 16 defined by the light converging points S3 overlaps the phase angle recorded area 18.

Figure 6:
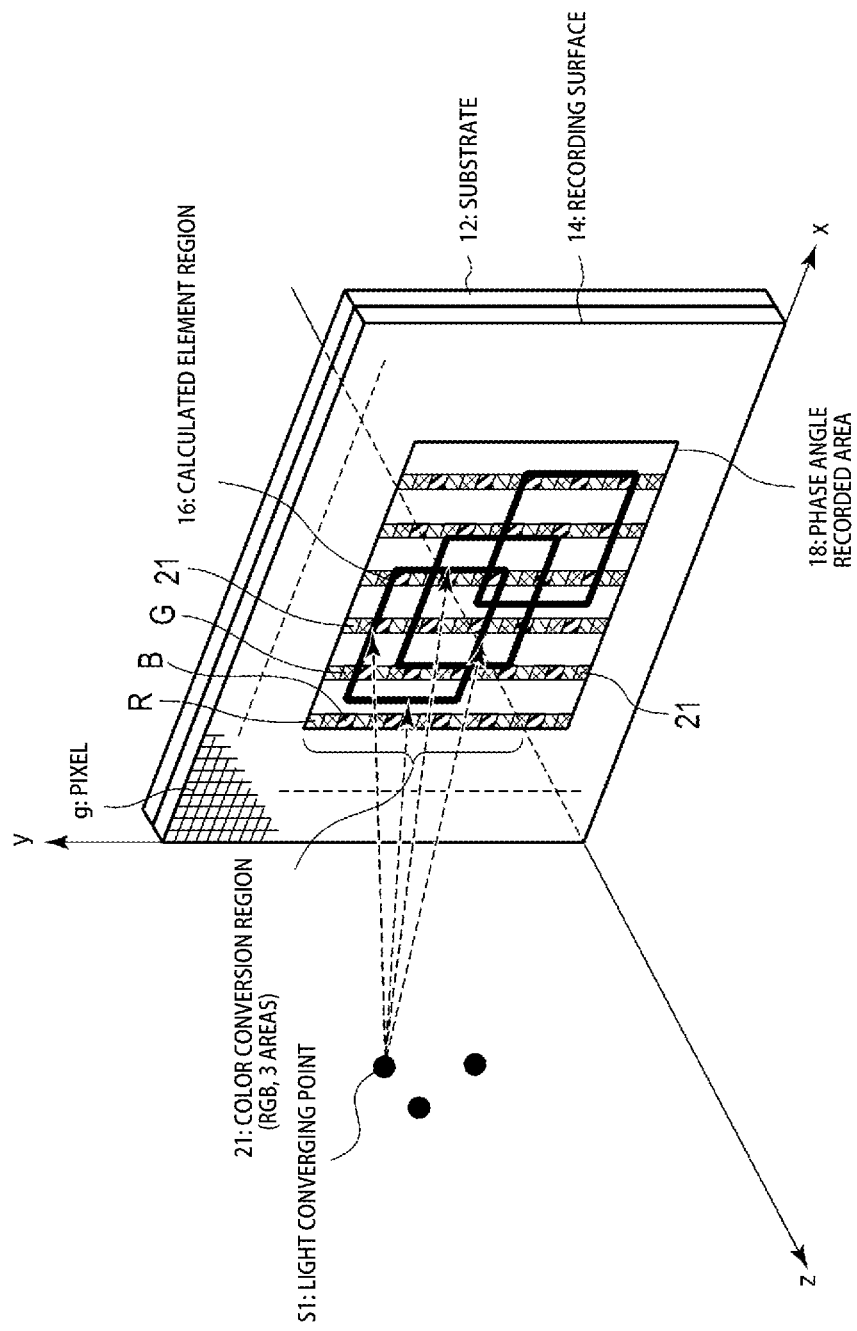
FIG. 6 is a conceptual diagram illustrating an example arrangement of a color conversion region in which RGBs are repeatedly arranged in a vertical direction.
Figure 7:
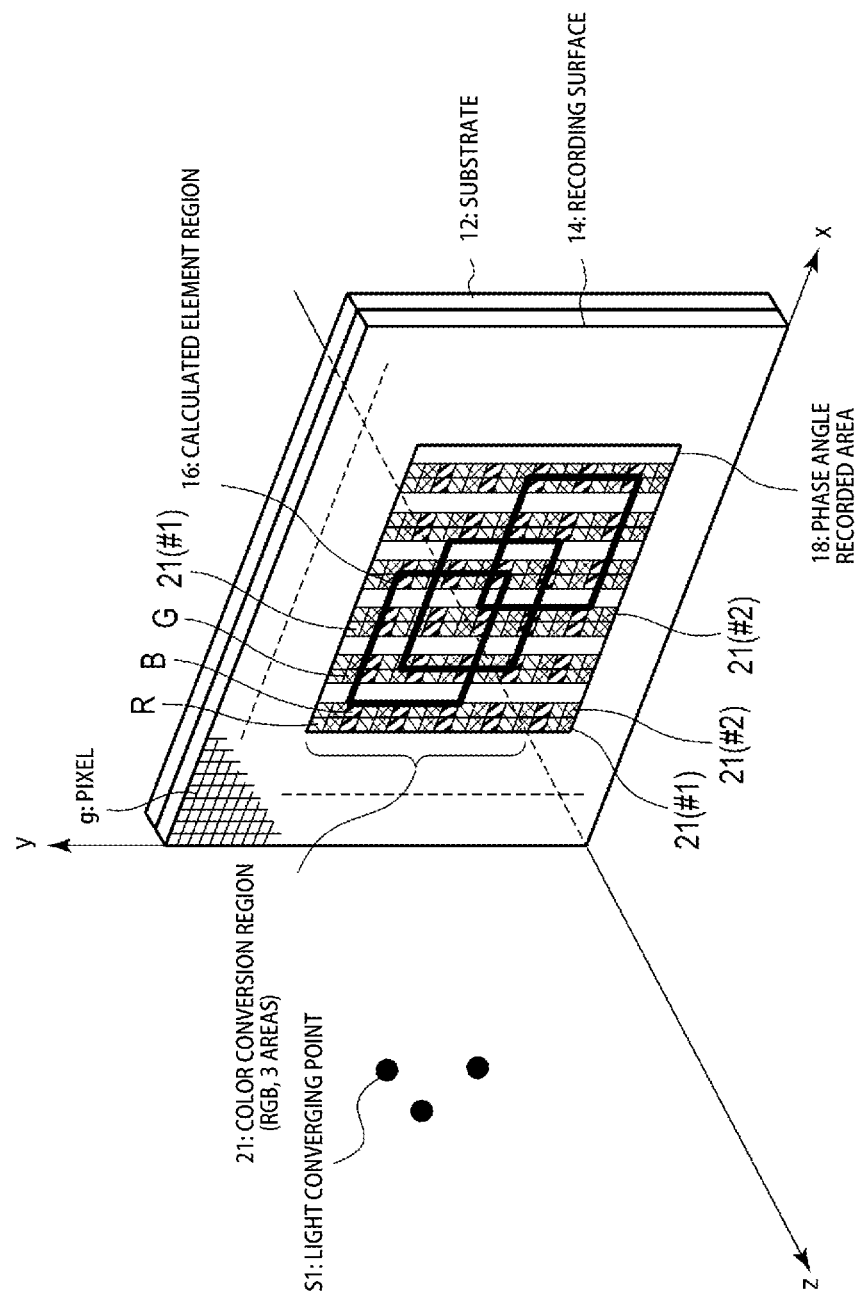
FIG. 7 is a conceptual diagram illustrating an example arrangement of two arrays of color conversion regions in which RGBs are repeatedly arranged in a vertical direction.

Further, as shown in FIG. 6, the phase angle recorded area 18 includes an RGB color conversion region 21 in which red regions R, green regions G, and blue regions B are repeatedly arranged in the vertical direction in the figure. Kinoform lenses according to the intensity of each RGB color are provided to reconstruct the three-dimensional reconstructed image 40 in full RGB colors. FIG. 7 differs from FIG. 6 in that the data recorded in a color conversion region 21 (#1), which corresponds to the color conversion region 21 of FIG. 6, is copied to a horizontally adjacent position to form a color conversion region 21 (#2) adjacent to the color conversion region 21 (#1). Accordingly, the luminescence of the reconstruction positions can be made twice that of FIG. 6.

Figure 8:
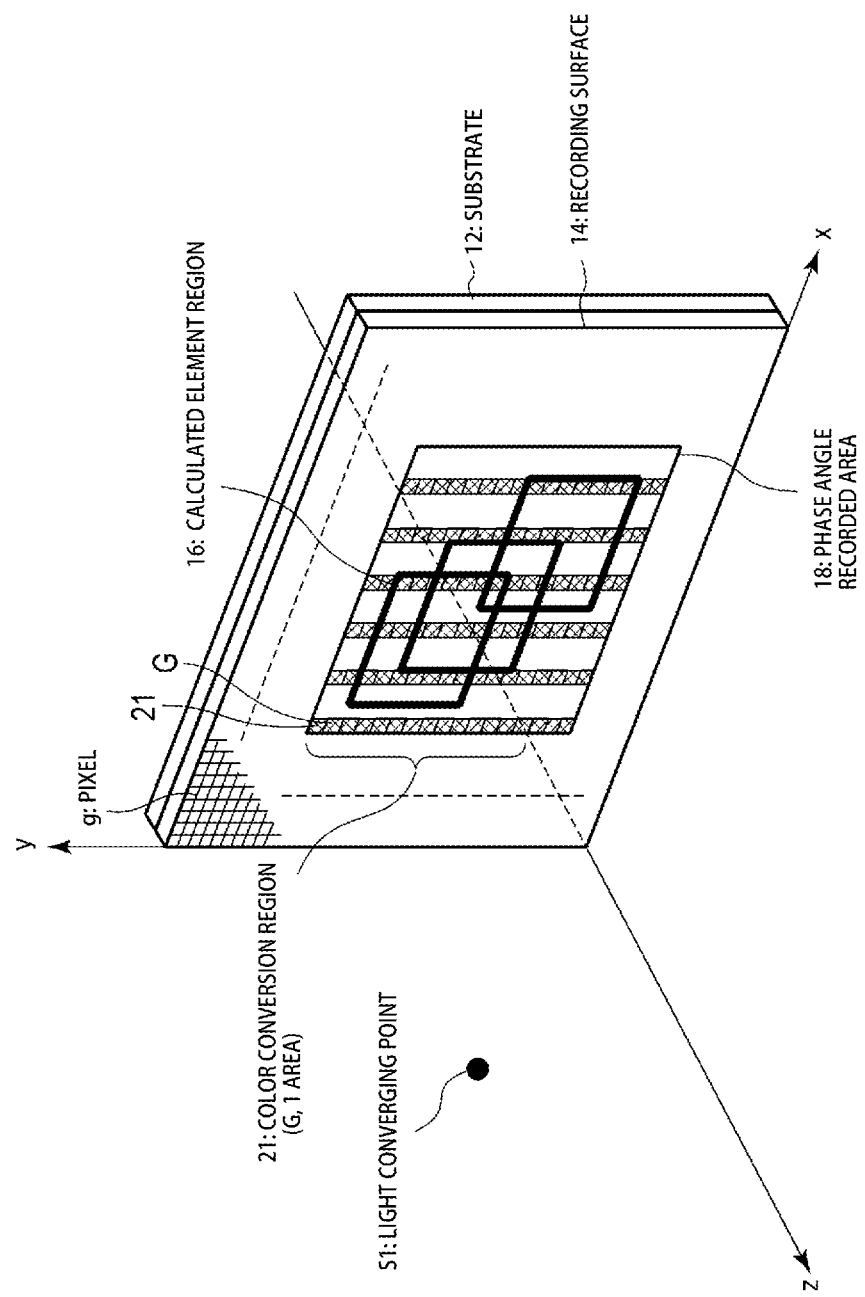
FIG. 8 is a conceptual diagram illustrating an example arrangement of a color conversion region in which only Gs are arranged in a vertical direction.

In FIG. 8, the regions which correspond to the RGB regions in the color conversion region 21 of FIG. 6 are all replaced with the green regions G, i. e., the data recorded in the green region G of FIG. 6 is copied the adjacent red and blue regions R and B. Accordingly, the luminescence of green components can be made three times higher than in FIG. 6.

Figure 9:
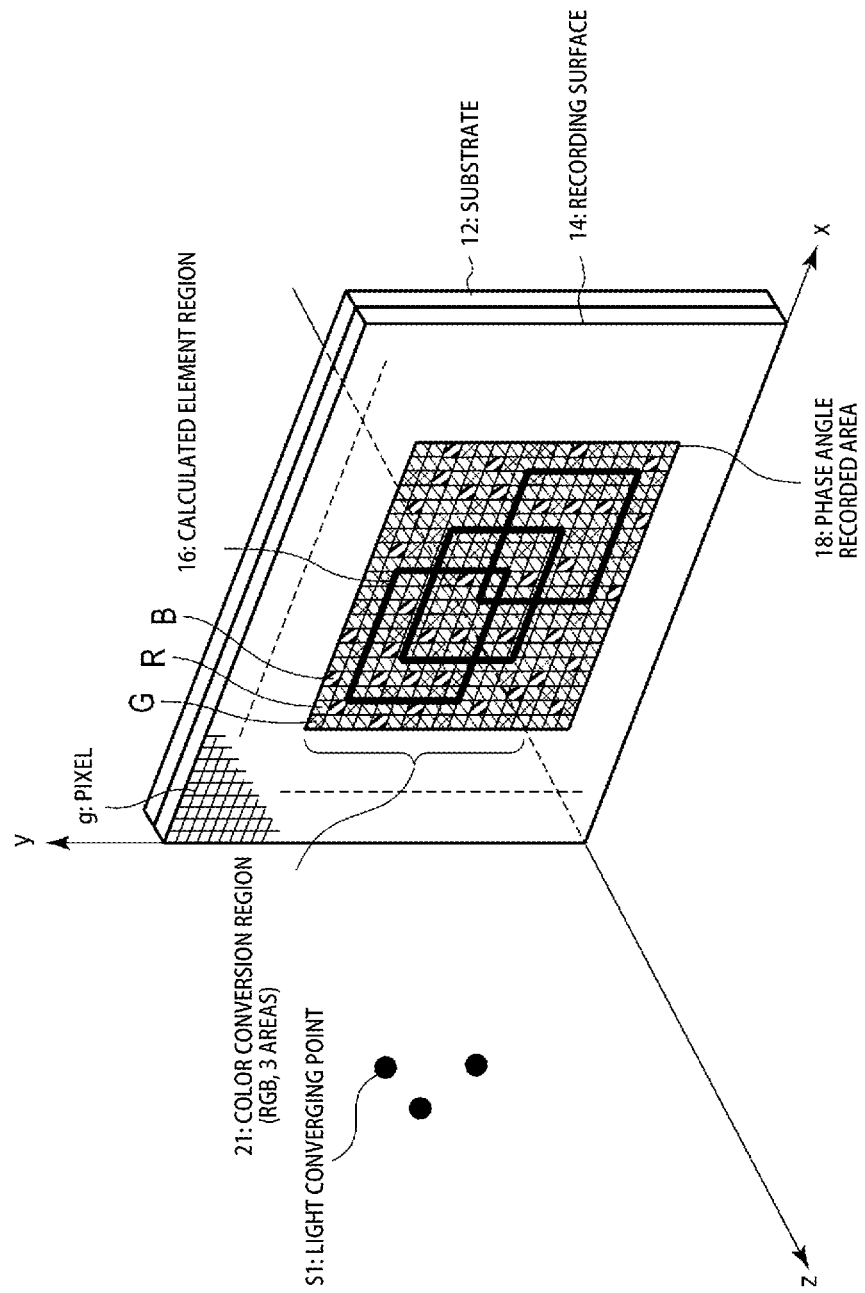
FIG. 9 is a conceptual diagram illustrating an example arrangement of a color conversion region in which R, B, and G are randomly arranged in a vertical direction.

FIG. 6 illustrates the color conversion region 21, in which the red regions R, the green regions G, and the blue regions B are regularly repeated in the vertical direction. On the other hand, as shown in FIG. 9, the red regions R, the green regions G, and the blue regions B can be randomly disposed in the color conversion region 21. With this random arrangement, the RGB ratio can be freely changed without changing the arrangement of the color conversion regions 21.

Figure 10:
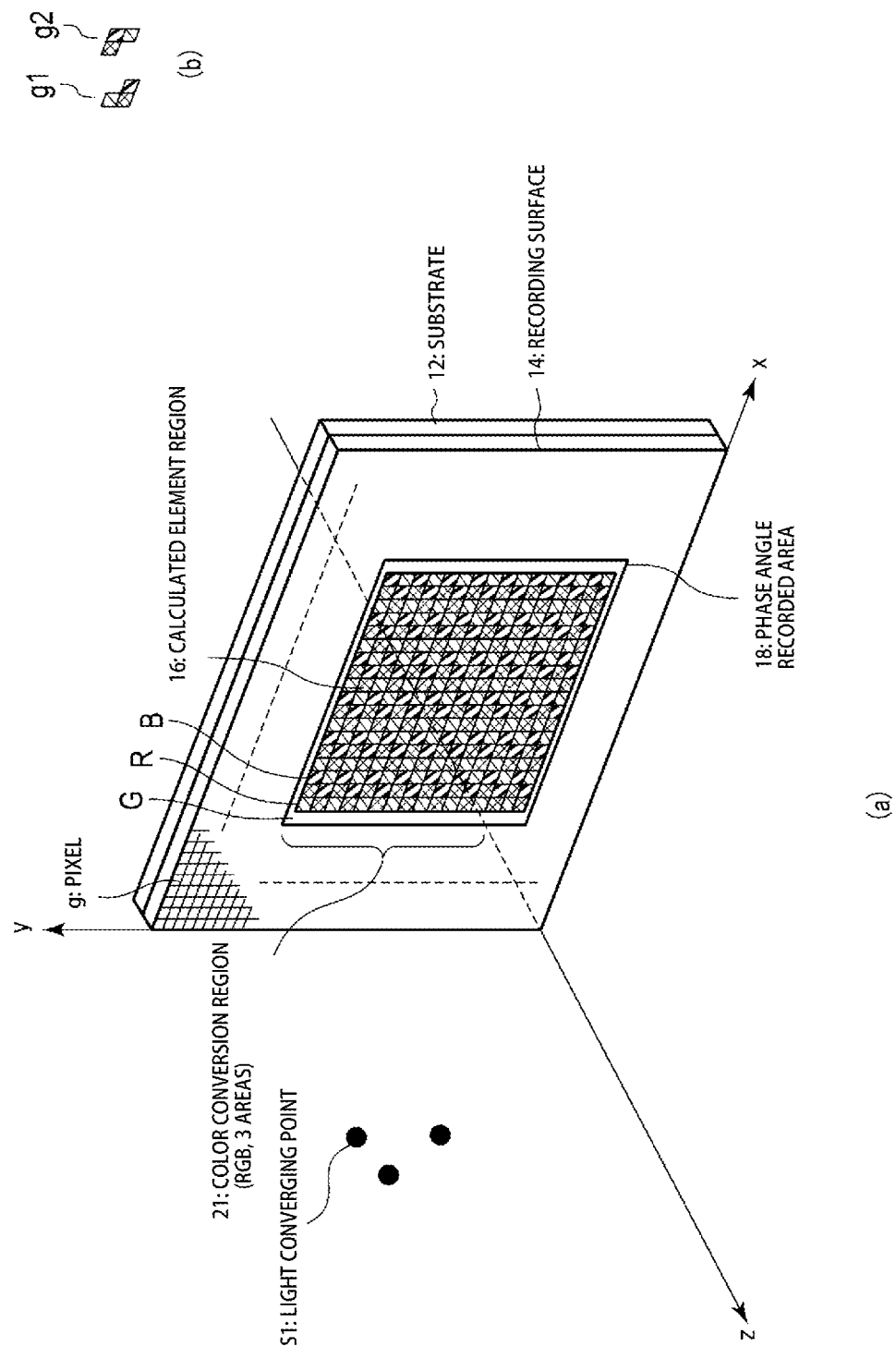
FIG. 10 is a conceptual diagram illustrating an example arrangement of a color conversion region in which a plurality of pixel patterns are arranged.

FIG. 10(a) illustrates an example, which differs from FIG. 9 in that the red regions R, the green regions G, and the blue regions B are regularly arranged in the color conversion region 21. However, instead of the same pattern of pixels g, a plurality of patterns of pixels g1 and g2 as shown in FIG. 10(b) are arranged in the color conversion region 21. The pixels g1 and g2 both have an L-shape, but are different in the pattern of RGB arrangement. The pixel g1 is an L-shaped pixel in which the green region G is located at the center, and the blue region B and the red pixel R are located adjacent to the green region G. On the other hand, the pixel g2 is an L-shaped pixel in which the blue region B is located at the center, and the green region G and the red pixel R are located adjacent to the blue region B. Although FIG. 10(b) shows only two patterns of the pixels g1 and g2, the pattern of pixels and the number of patterns are merely examples, and a plurality of patterns of pixels g can be arranged in any way in the color conversion region 21.

Moreover, two or more regions having different arrangements may also be provided. A mark can be formed by such different arrangements. The mark thus formed can be characters, codes, landmarks, portraits, symbols, or the like.

When RGB=(255, 255, 255) in the digital image, for example, recording of RGB=(10, 20, 30) can be achieved by adjusting the recording area in the monochromatic region 22. For example, recording can be performed at the area ratio of (10/255, 20/255, 30/255). Further, in addition to the method of recording by adjusting the area, the above amp (amplitude of light at the light converging point) can also be adjusted.

Figure 11:
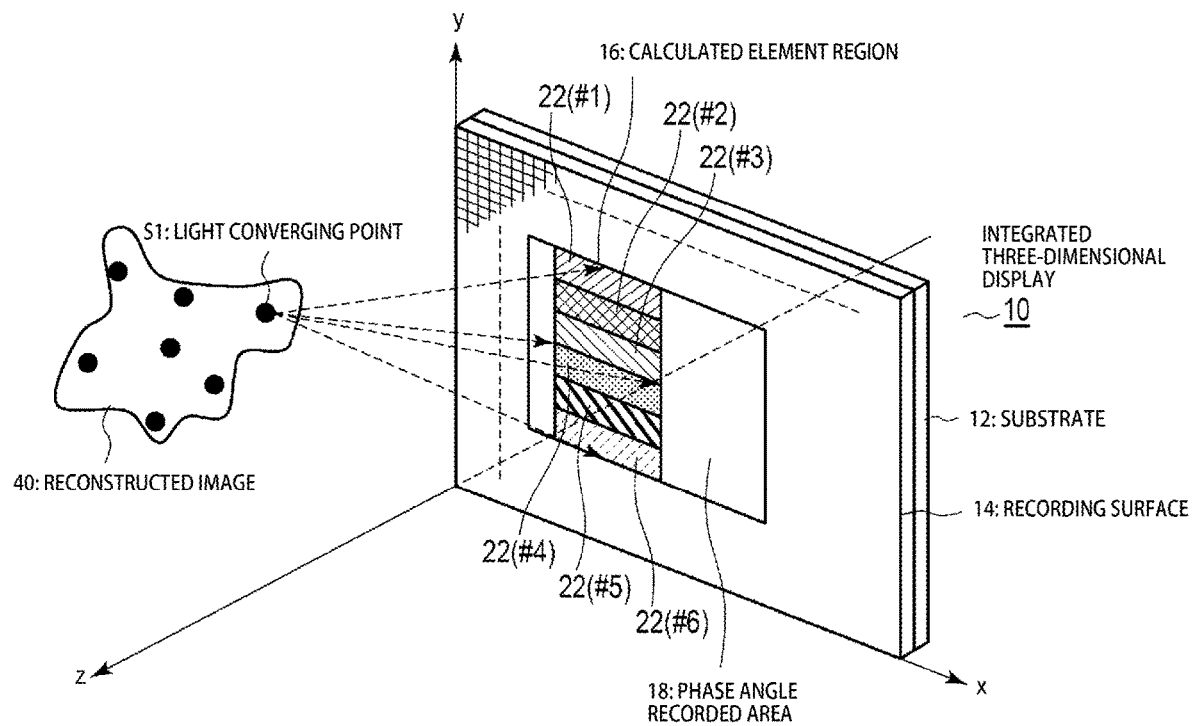
FIG. 11 is a conceptual diagram illustrating an integrated three-dimensional display having six types of monochromatic regions for reflected light of six wavelengths.

FIG. 11 is a conceptual diagram illustrating an integrated three-dimensional display 10 having six types of monochromatic regions 22 (#1), (#2), (#3), (#4), (#5), and (#6) for reflected light of six wavelengths.

FIG. 11 illustrates an example in which six monochromatic regions 22 (#1), (#2), (#3), (#4), (#5), and (#6) having a rectangular shape elongated in the X axis direction are stacked in the Y axis direction. However, these are merely examples, and other arrangements are also possible.

Figure 12:
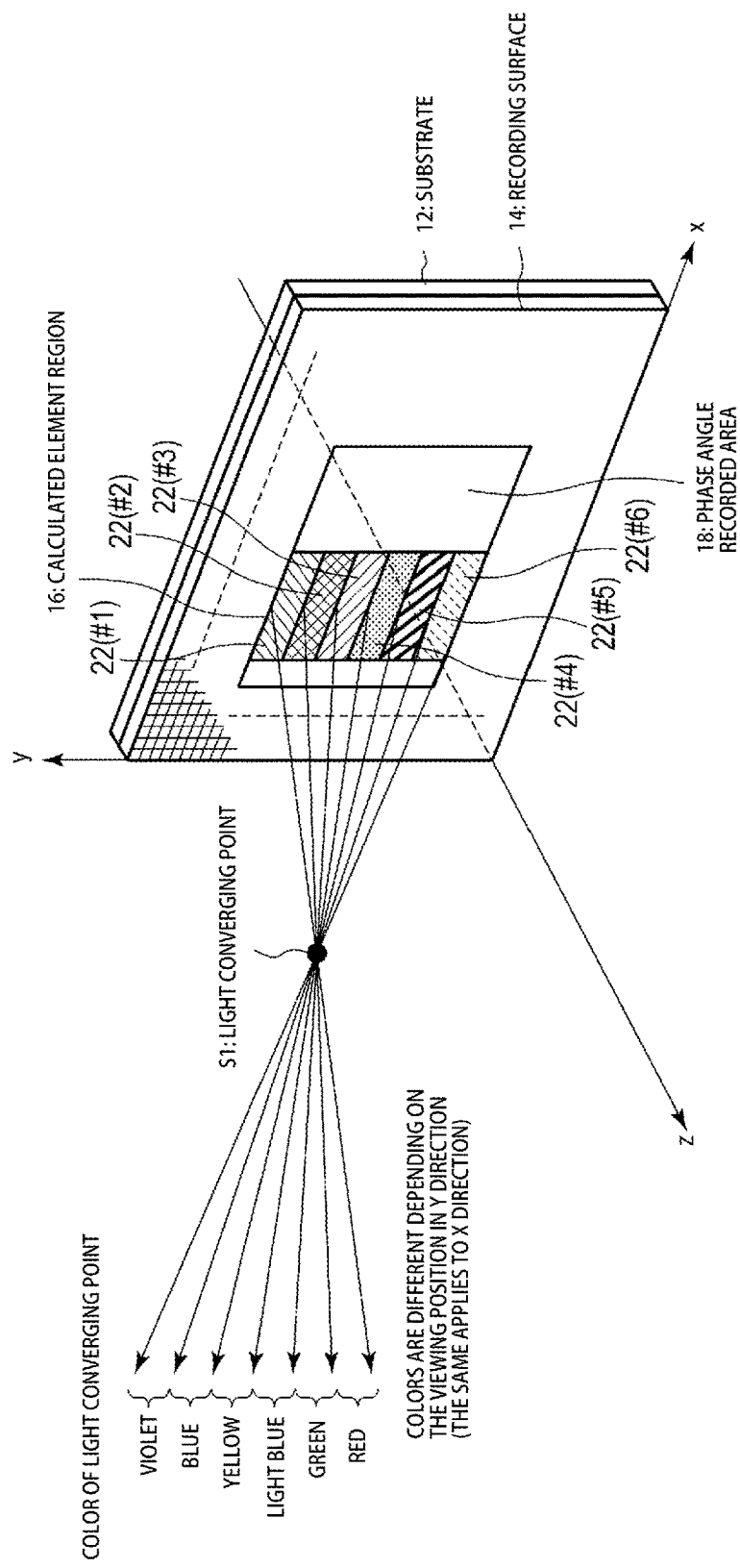
FIG. 12 is a conceptual diagram illustrating that different colors are displayed depending on the viewing position.

FIG. 12 is a conceptual diagram illustrating that different colors are displayed depending on the viewing position.

According to the configuration of FIG. 11, one light converging point S1 is reconstructed in six different colors depending on the viewing direction as shown in FIG. 12.

Figure 13:
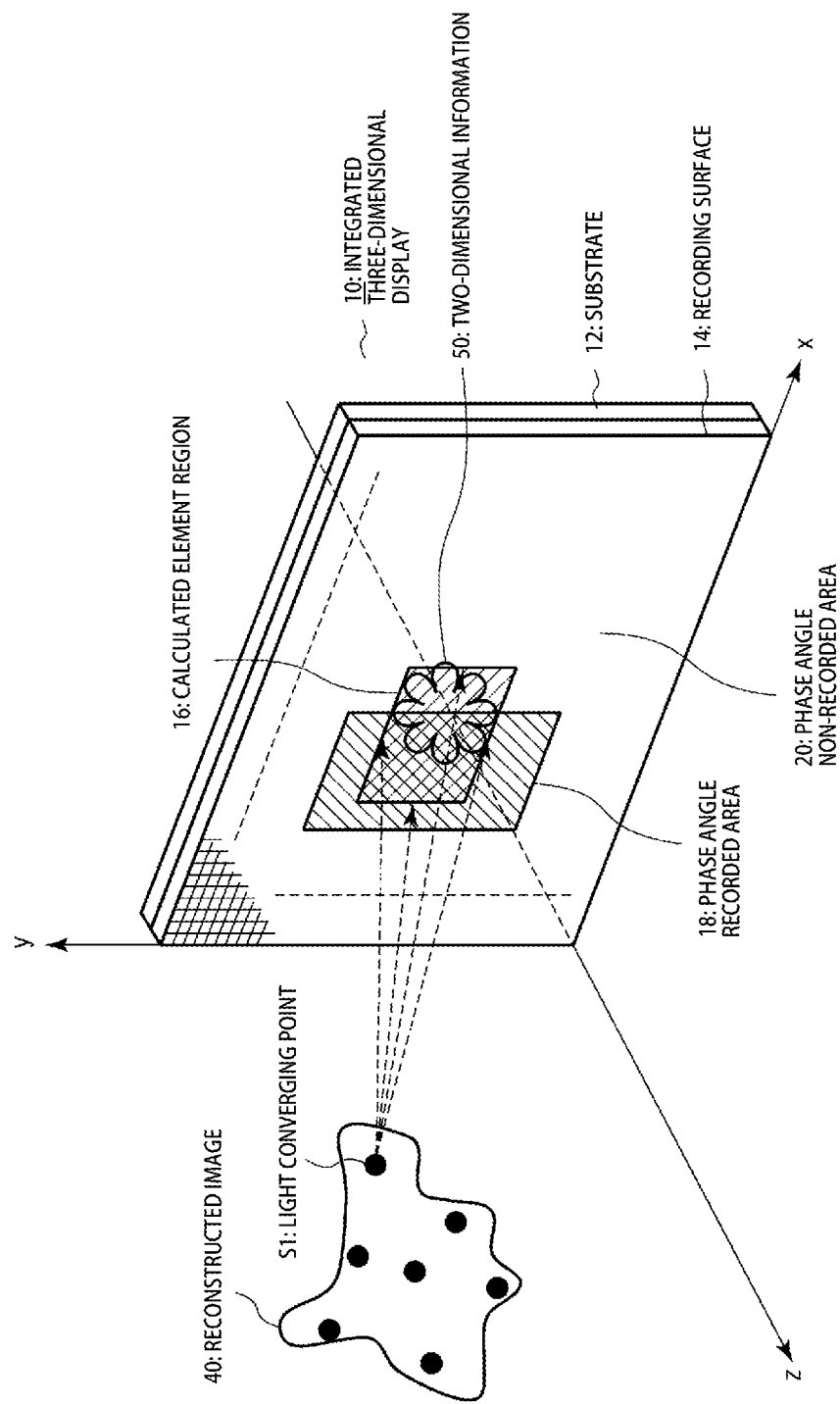
FIG. 13 is a conceptual diagram illustrating that two-dimensional information having a shape representing a mark is applied to an integrated three-dimensional display.

FIG. 13 is a conceptual diagram illustrating that two-dimensional information having a shape representing a mark is applied to an integrated three-dimensional display.

Two-dimensional information 50 can be imparted to the integrated three-dimensional display 10 by being printed on a print layer (not shown) on a side of the recording surface 14 facing the observer, i. e., the light converging point Sn. Alternatively, the two-dimensional information 50 can be imparted to the integrated three-dimensional display 10 by demetallizing the metallic reflective layer 24 using a laser to remove metal from the reflective layer 24 to thereby control reflection of light.

The two-dimensional information 50 is not limited to a shape representing a mark, and can be a shape representing a character or a shape representing a machine-readable code. These marks, characters, and patterns can be applied as personal identification information.

According to the configuration shown in FIG. 13, in which the two-dimensional information 50 and the information for converging reflected light to the light converging point Sn are located in the same region, high anti-counterfeiting properties can be achieved. Since converging light to the light converging point Sn acts to reconstruct the three-dimensional reconstructed image 40, the information for converging reflected light to the light converging point Sn corresponds to three-dimensional information. That is, FIG. 13 illustrates a configuration in which the two-dimensional information 50 and the three-dimensional information are located in the same region in order to achieve high anti-counterfeiting properties.

Figure 14A:
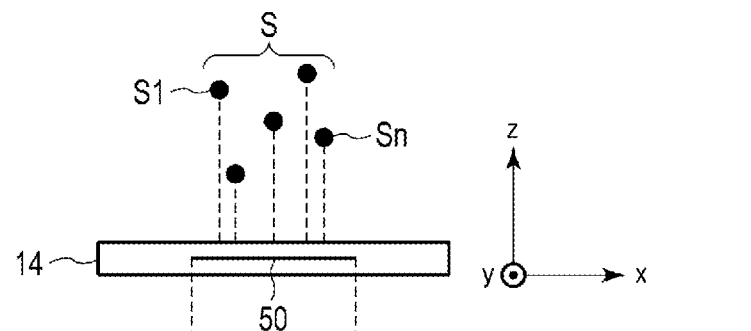
FIGS. 14A (a) and (b) are a cross-sectional view and a plan view illustrating an example positional relationship between two-dimensional information and three-dimensionally distributed light converging points, which do not overlap each other in the xy plane.
Figure 14A:
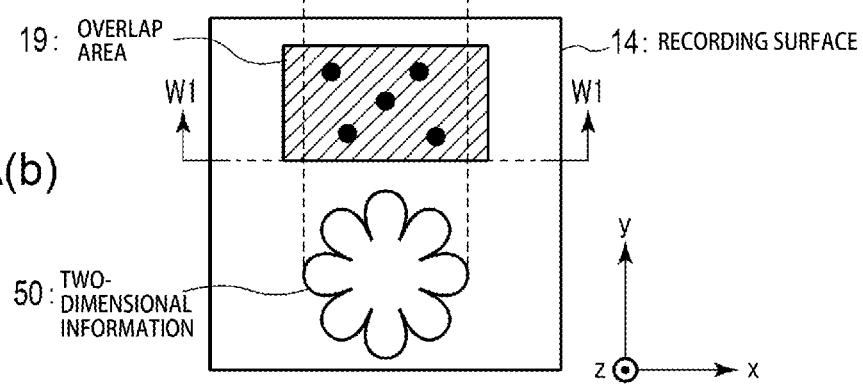

FIGS. 14A(a) and (b) are a cross-sectional view and a plan view illustrating an example positional relationship between the two-dimensional information 50 and the three-dimensionally distributed light converging points S (S1 to Sn), which do not overlap each other in the xy plane.

Figure 14B:
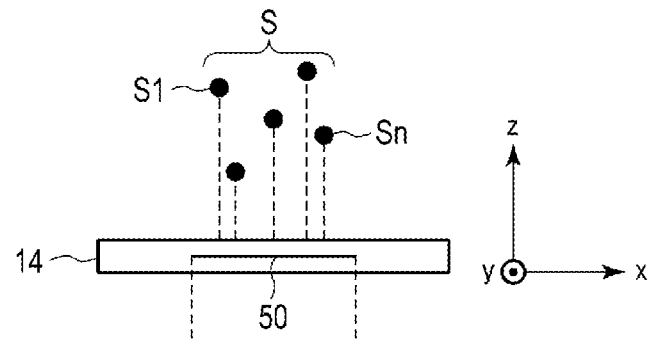
FIGS. 14B (a) and (b) are a cross-sectional view and a plan view illustrating an example positional relationship between two-dimensional information and three-dimensionally distributed light converging points, which overlap each other in the xy plane.
Figure 14B:
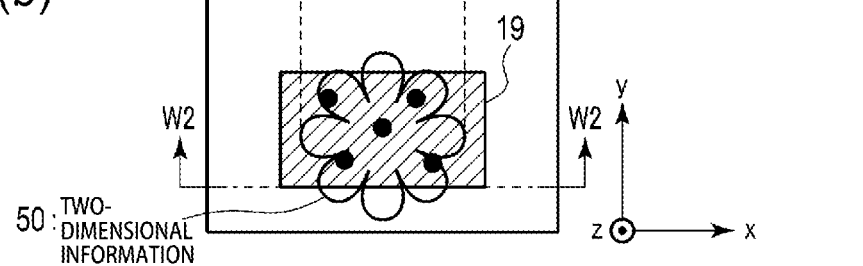

FIGS. 14B(a) and (b) are a conceptual diagram illustrating an example positional relationship between the two-dimensional information 50 and the three-dimensionally distributed light converging points S (S1 to Sn), which overlap each other in the xy plane.

The cross-sectional views shown in FIG. 14A(a) and FIG. 14B(a) are taken along the line W1-W1 and the line W2-W2 in FIG. 14A(b) and FIG. 14B(b), respectively, and illustrate the positional relationship between the recording surface 14 and the light converging point S in the z direction, i. e., the depth direction of the recording surface 14. The plan views shown in FIG. 14A(b) and FIG. 14B(b) illustrate the positional relationship between the overlap area 19 and the two-dimensional information 50 in the xy plane.

According to the configuration shown in FIGS. 14A (a) and (b), in which the two-dimensional information 50 and the three-dimensional information are separated in the xy plane, only the two-dimensional information 50 can be counterfeited, while the genuine three-dimensional information may remain unchanged. Therefore, anti-counterfeiting properties are poor.

On the other hand, according to the configuration shown in FIGS. 14B (a) and (b), the two-dimensional information 50 and three-dimensional information are arranged at least partially overlapping each other in the depth direction of the recording surface 14. Therefore, since it is difficult to counterfeit both the two-dimensional information 50 and three-dimensional information, anti-counterfeiting properties can be improved.

Figure 15A:
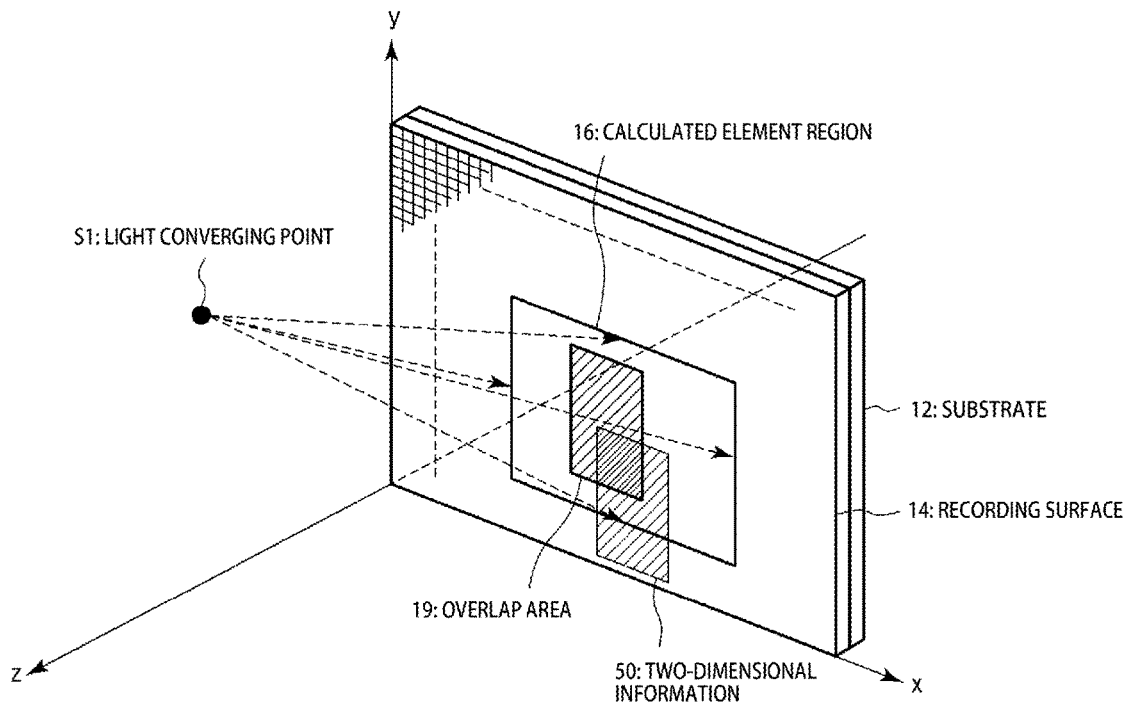
FIG. 15A is a conceptual diagram illustrating a positional relationship between an overlap area and two-dimensional information on a recording surface (the overlap area is partially covered with the two-dimensional information).
Figure 15B:
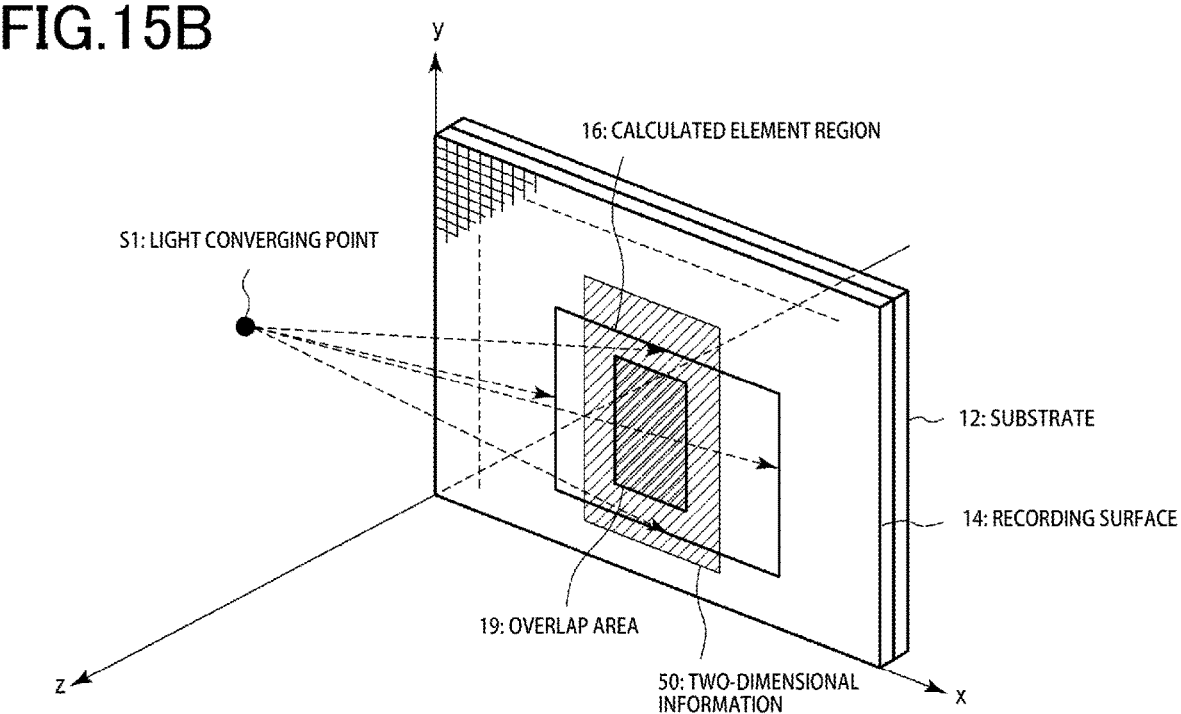
FIG. 15B is a conceptual diagram illustrating a positional relationship between an overlap area and two-dimensional information on a recording surface (the overlap area is entirely covered with the two-dimensional information).

FIGS. 15A and 15B are conceptual diagrams illustrating a positional relationship between the overlap area 19 and the two-dimensional information 50 on the recording surface 14.

FIG. 15A illustrates a state in which only part of the overlap area 19 overlaps the two-dimensional information 50, i. e., the two-dimensional information 50 does not overlap the entire surface of the overlap area 19. FIG. 15B illustrates a state in which the entire surface of the overlap area 19 is covered with the two-dimensional information 50.

As shown in FIG. 15B, when the entire surface of the overlap area 19 is covered with the two-dimensional information 50, the light converging point Sn cannot be reconstructed since the overlap area 19 cannot be used. On the other hand, in the positional relationship shown in FIG. 15A, even when part of the overlap area 19 is covered with the two-dimensional information 50, the light converging point Sn can be reconstructed by using a portion of the overlap area 19 which is not covered with the two-dimensional information 50. Therefore, for recording of the two-dimensional information 50 in the recording surface 14, the two-dimensional information 50 is positioned without covering the entire surface of the overlap area 19 as shown in FIG. 15A.

Figure 16A:
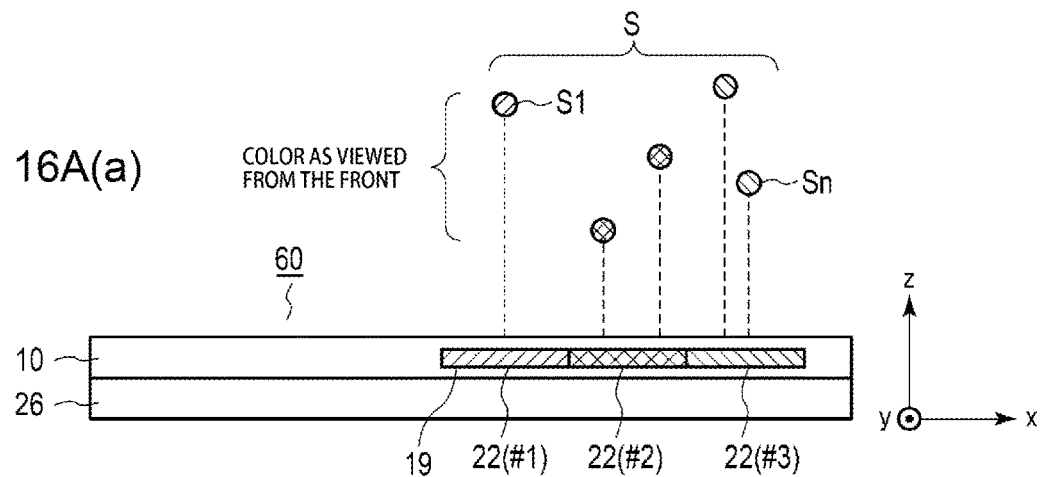
FIGS. 16A (a) and (b) are a cross-sectional view and a plan view illustrating an embodiment of an authentication medium in which two-dimensional information (marks) and light converging points are located overlapping each other in the xy plane.
Figure 16A:
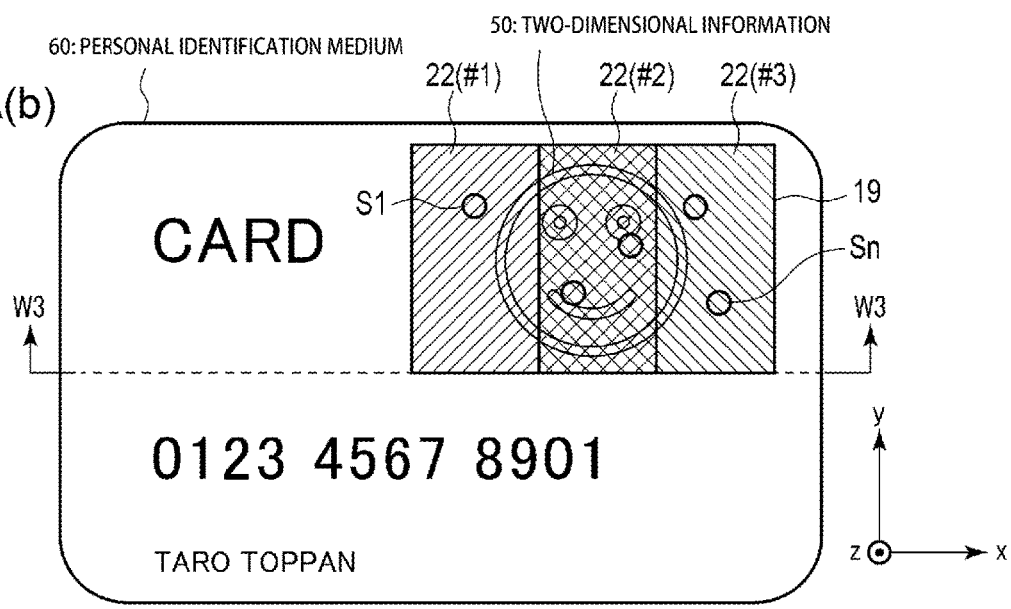

FIGS. 16A (a) and (b) and 16B (a) and (b) are cross-sectional views and plan views illustrating an embodiment of an authentication medium in which the two-dimensional information 50 and the three-dimensionally distributed points S (S1 to Sn) are located overlapping each other in the xy plane.

Figure 16B:
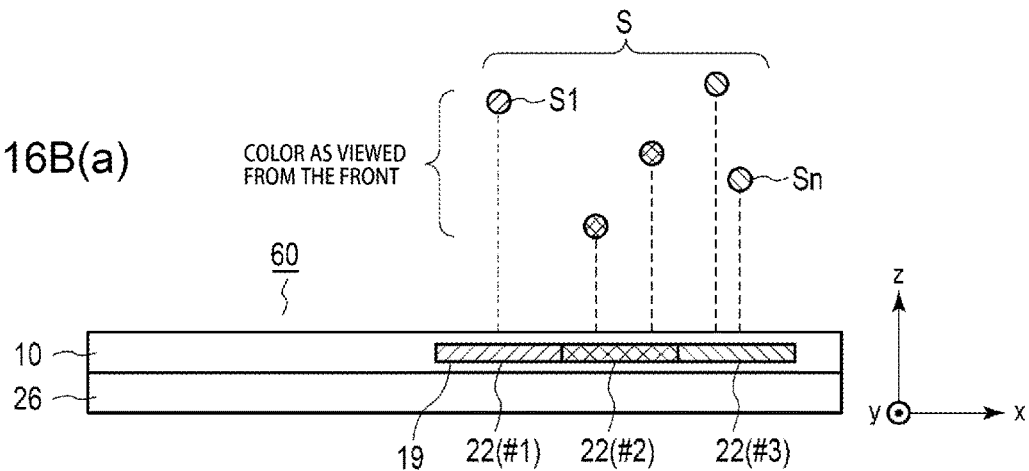
FIGS. 16B (a) and (b) are a cross-sectional view and a plan view illustrating an embodiment of an authentication medium in which two-dimensional information (a two-dimensional barcode) and light converging points are located overlapping each other in the xy plane.
Figure 16B:
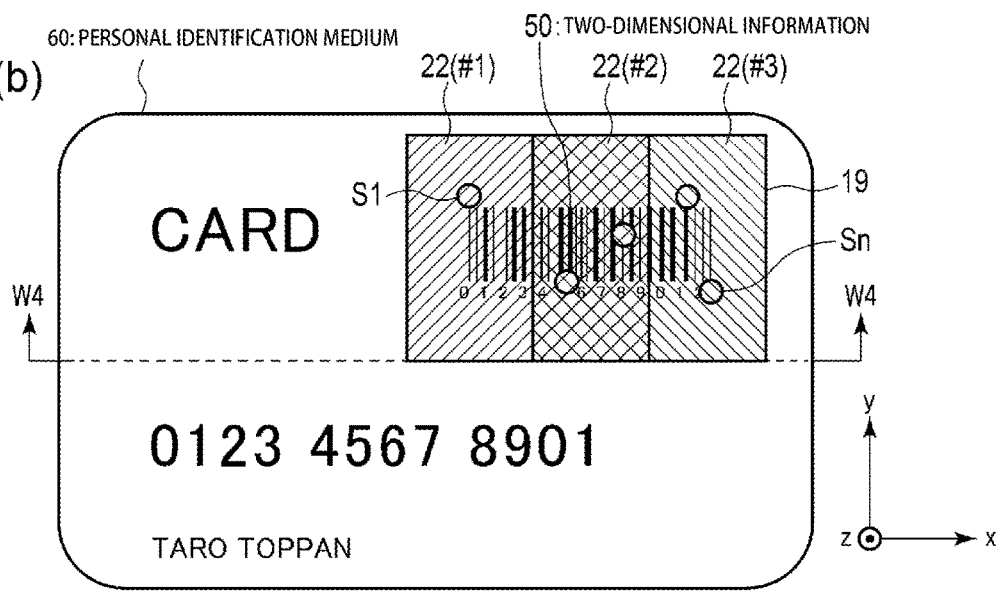

The cross-sectional views shown in FIG. 16A(a) and FIG. 16B(a) are taken along the line W3-W3 and the line W4-W4 of FIG. 16A(b) and FIG. 16B(b), respectively, and an authentication medium 60 shown in the figures includes the integrated three-dimensional display 10 attached to the object 26. In particular, as clearly shown in FIG. 16A(b) and FIG. 16B(b), the overlap area 19 includes three types of monochromatic regions 22 (#1), (#2), and (#3) having a vertically long rectangular shape of the same size, which are arranged in this order from the left to the right in the figure without overlapping each other. These three types of monochromatic regions 22 (#1), (#2), and (#3) can be colored in different colors.

The two-dimensional information 50 can be imparted to the authentication medium 60 by providing a print layer (not shown) on the upper surface of the overlap area 19, and printing the two-dimensional information 50 on the print layer. Alternatively, the two-dimensional information 50 can also be imparted to the authentication medium 60 by demetallizing the metallic reflective layer 24 instead of providing a print layer.

These two-dimensional information 50 can display a mark or a two-dimensional barcode. FIG. 16A(b) illustrates a case where the two-dimensional information 50 is a mark, and FIG. 16B(b) illustrates a case where the two-dimensional information 50 is a barcode.

The two-dimensional information 50 is positioned in a configuration shown in FIG. 15A, in which at least part of the overlap area 19 is not covered with the two-dimensional information 50, rather than a configuration shown in FIG. 15B, in which the entire surface of the overlap area 19 is covered with the two-dimensional information 50. With this configuration, the two-dimensional information 50 can be imparted to the integrated three-dimensional display 10 without causing the light converging point Sn to disappear.

Figure 17A:
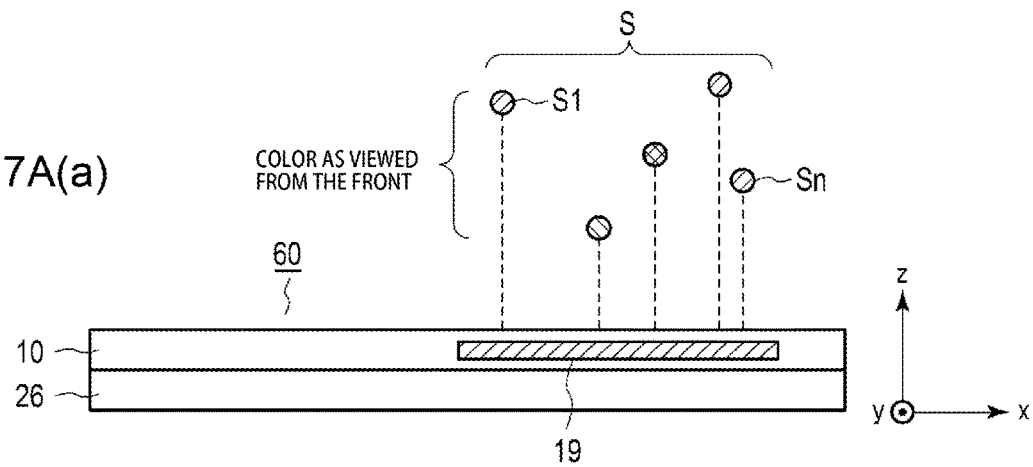
FIGS. 17A (a) and (b) are a cross-sectional view and a plan view illustrating an embodiment of an authentication medium having a mark represented by a planar shape of a monochromatic region.
Figure 17A:
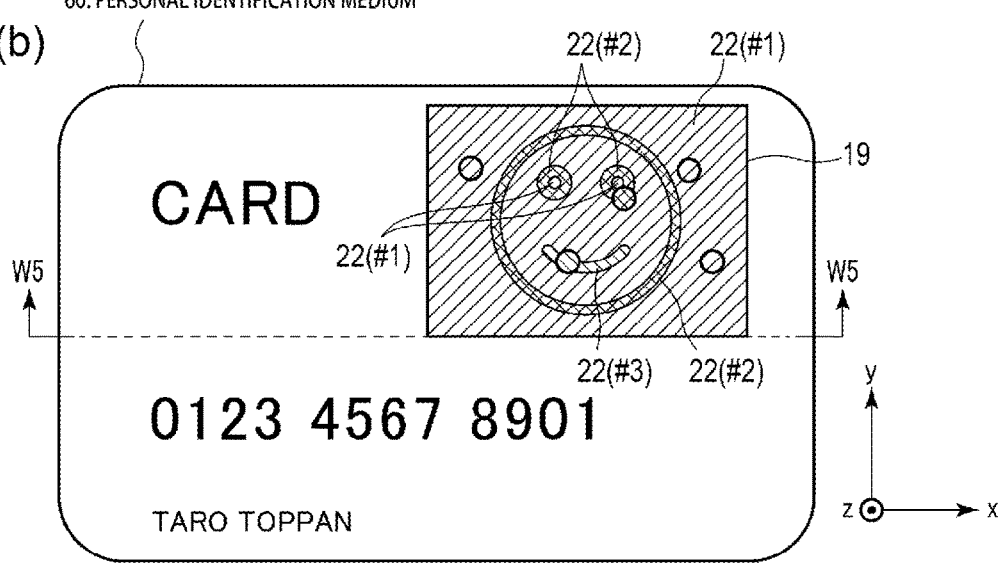

FIGS. 17A(a) and (b) are a cross-sectional view and a plan view illustrating an embodiment of an authentication medium having a mark represented by a planar shape of a monochromatic region.

FIG. 17A(a) shows a cross-sectional view taken along the line W5-W5 in FIG. 17A(b).

According to an authentication medium illustrated in FIGS. 17A(a) and (b), particularly as shown in FIG. 17A(b), a mark is represented by planar shapes of the monochromatic regions 22 (#1), (#2), and (#3) disposed in the overlap area 19. Similarly, not only marks, but also characters or machine-readable codes can be represented by the planar shapes or configurations of a plurality of types of monochromatic regions 22. Such marks, characters, or codes can be provided with personal identification information to thereby provide the authentication medium 60 with personal identification information.

Figure 17B:
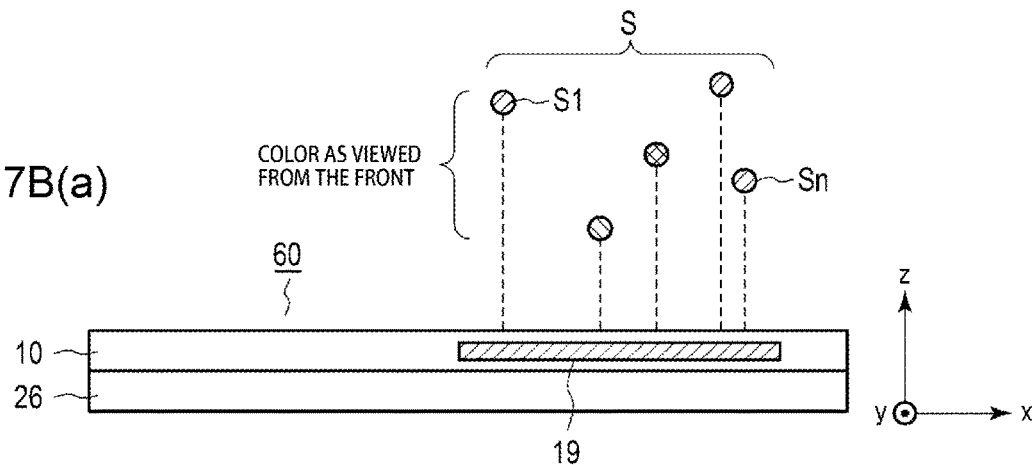
FIGS. 17B (a) and (b) are a cross-sectional view and a plan view illustrating an embodiment of an authentication medium having a mark and a two-dimensional barcode represented by a planar shape of a monochromatic region.
Figure 17B:
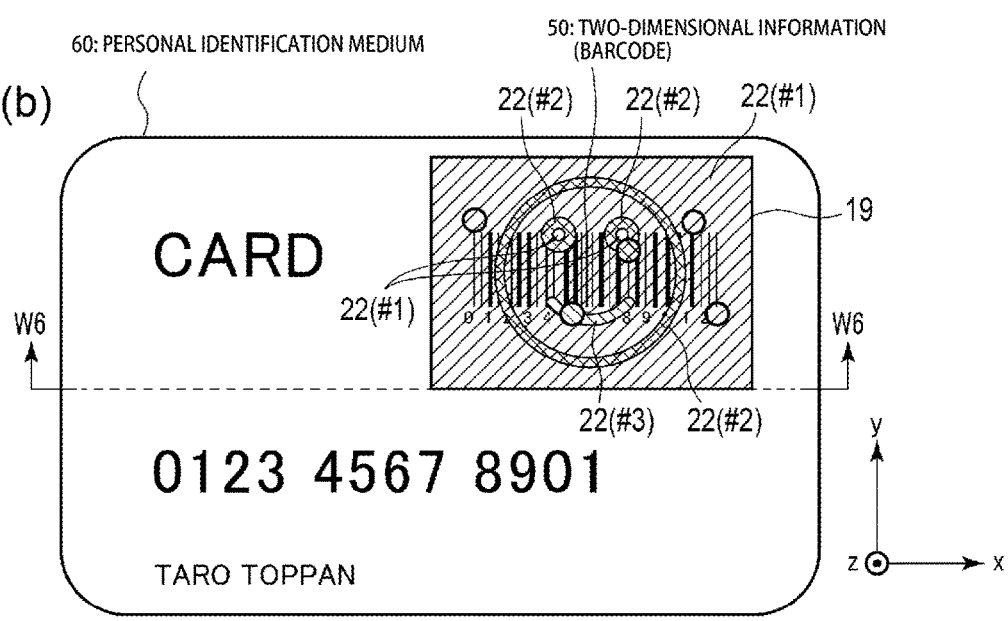

FIGS. 17B (a) and (b) are a cross-sectional view and a plan view illustrating an embodiment of an authentication medium having a mark and a barcode pattern represented by a planar shape of a monochromatic region.

FIG. 17B(a) shows a cross-sectional view taken along the line W6-W6 in FIG. 17B(b).

In the authentication medium 60 shown in FIGS. 17B (a) and (b), a print layer (not shown) is provided on the upper surface of the overlap area 19 on the authentication medium 60 shown in FIGS. 17A (a) and (b), as in FIGS. 16B (a) and (b), and the two-dimensional information (barcode information) 50 is printed on the print layer.

Figure 18A:
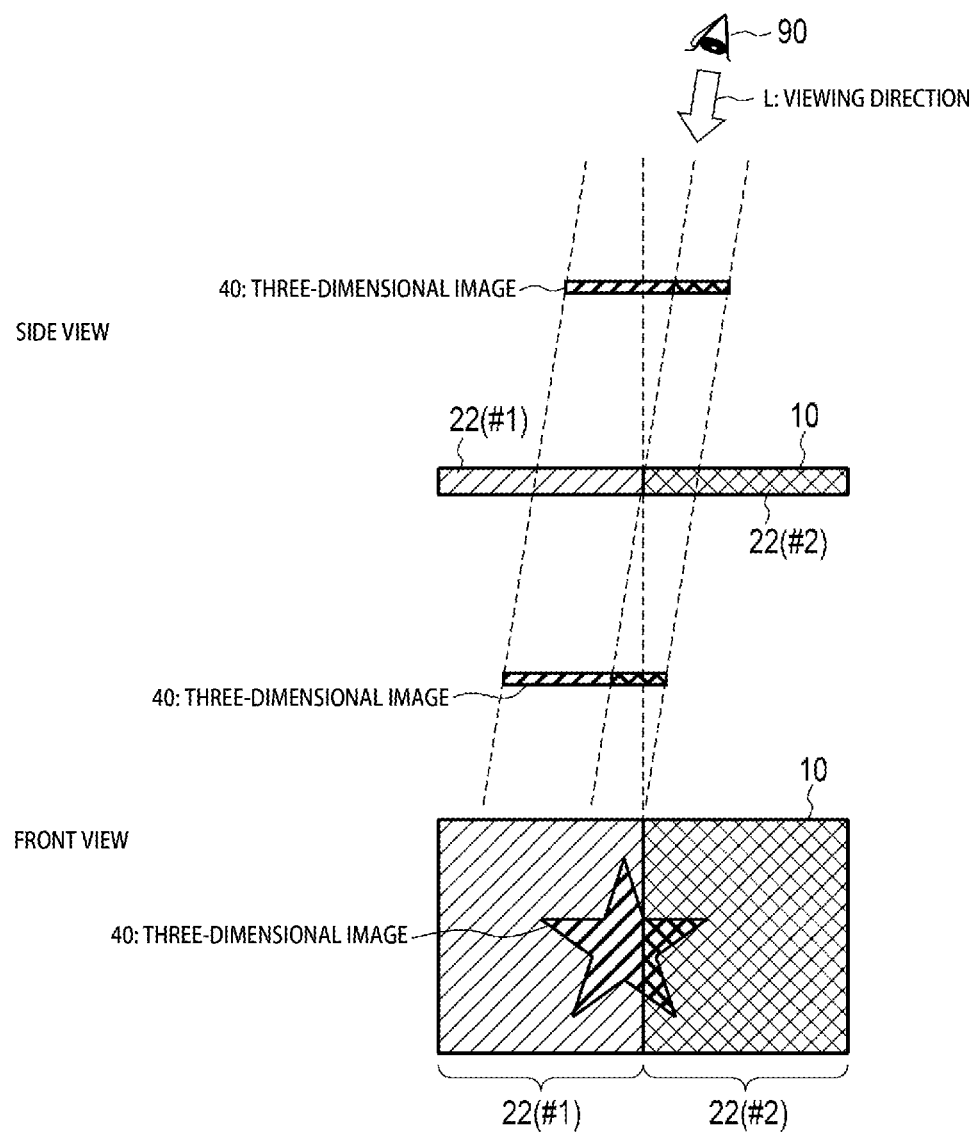
FIG. 18A is a conceptual diagram illustrating that a three-dimensional image is reconstructed across a plurality of monochromatic regions having different reconstructed colors (when a viewing direction is obliquely directed from the right).
Figure 18B:
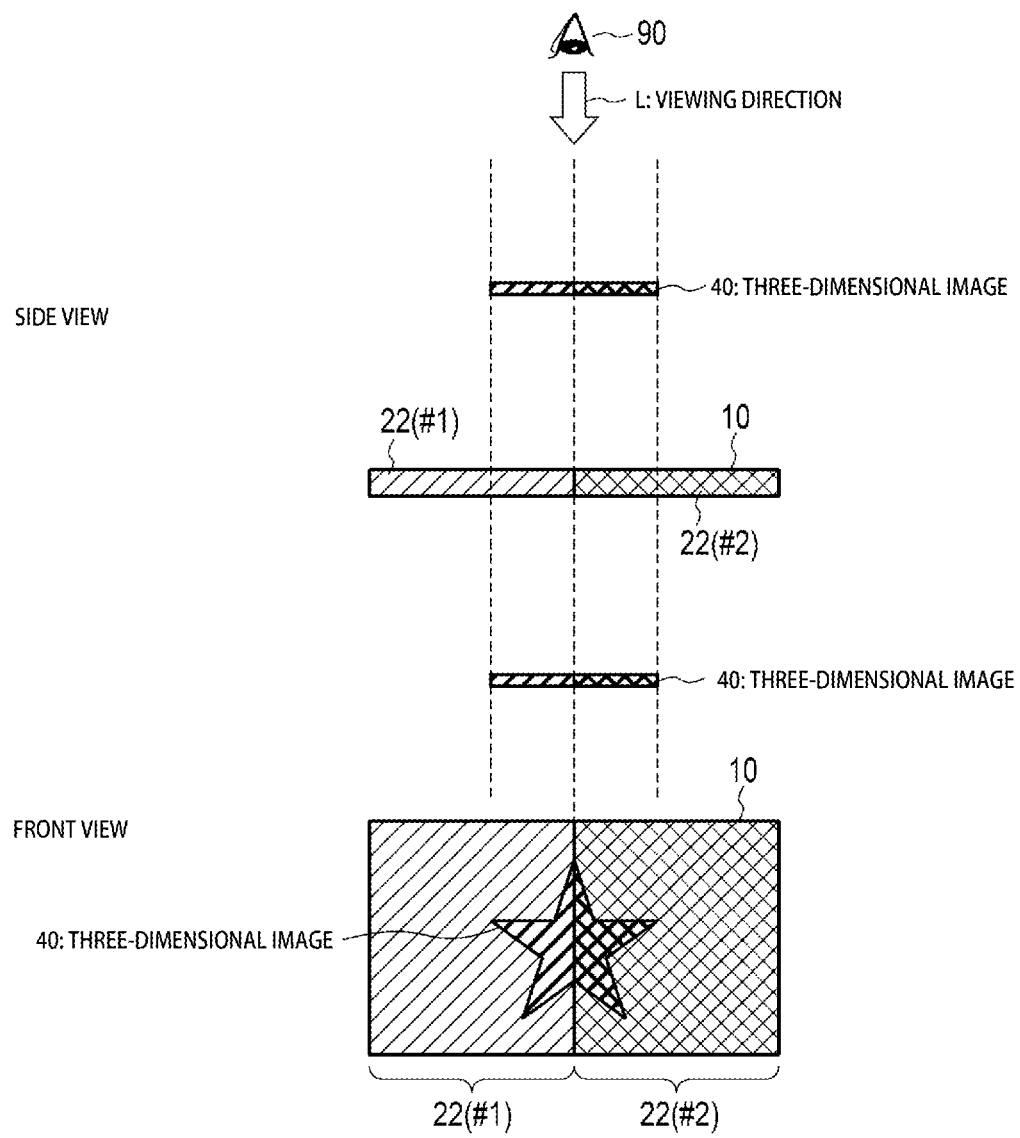
FIG. 18B is a conceptual diagram illustrating that a three-dimensional image is reconstructed across a plurality of monochromatic regions having different reconstructed colors (when a viewing direction is perpendicular to the surface).
Figure 18C:
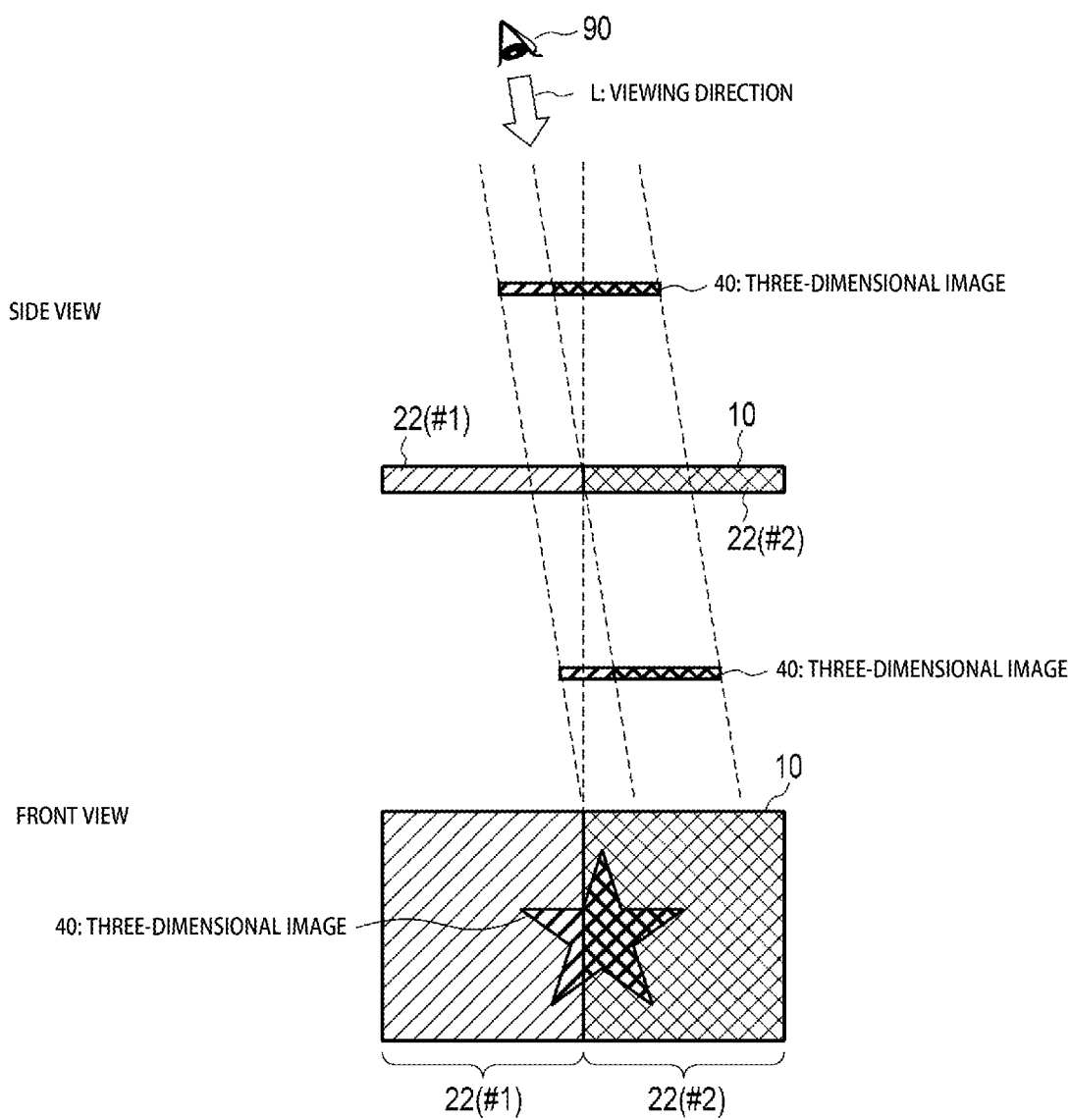
FIG. 18C is a conceptual diagram illustrating that a three-dimensional image is reconstructed across a plurality of monochromatic regions having different reconstructed colors (when a viewing direction is obliquely directed from the left).

FIGS. 18A, 18B, and 18C are conceptual diagrams illustrating that the three-dimensional image 40 is reconstructed across a plurality of monochromatic regions 22 (#1) and (#2) having different reconstructed colors.

As shown in front views in FIGS. 18A, 18B, and 18C, the monochromatic region 22 (#1) is positioned on the left half of the integrated three-dimensional display 10 (overlap area 19), and the monochromatic region 22 (#2) is positioned on the right half. The reflected light from the monochromatic region 22 (#1) converges on the light converging point Sn as a first reconstruction color (for example, red), and the reflected light from the monochromatic region 22 (#2) converges on the light converging point Sn as a second reconstruction color (for example, blue) to thereby reconstruct the reconstructed image 40.

FIG. 18B shows a side view illustrating the integrated three-dimensional display 10 observed by an observer 90 with a viewing direction perpendicular to the center of the front surface of the integrated three-dimensional display 10. In this case, as shown in the front view of FIG. 18B, the reconstructed image 40 observed is located at the center of the integrated three-dimensional display 10 with the left half being displayed in a first color and the right half being displayed in a second color.

FIG. 18A shows a side view illustrating the integrated three-dimensional display 10 observed by the observer 90 with a viewing direction which is obliquely directed from an upper right position relative to the center of the integrated three-dimensional display 10 in the figure in an angular range of 0(°) or more and 70(°) or less relative to a surface of the integrated three-dimensional display 10. In this case, as shown in the front view of FIG. 18A, the reconstructed image 40 observed is located shifted to the left from the center of the integrated three-dimensional display 10, and accordingly, the area displayed in a first color increases and the area displayed in a second color decreases compared to those shown in FIG. 18B.

On the other hand, FIG. 18C shows a side view illustrating the integrated three-dimensional display 10 observed by the observer 90 with a viewing direction which is obliquely directed from an upper left position relative to the center of the integrated three-dimensional display 10 in the figure in an angular range of 0(°) or more and 70(°) or less relative to a surface of the integrated three-dimensional display 10. In this case, as shown in the front view of FIG. 18C, the reconstructed image 40 observed is located shifted to the right from the center of the integrated three-dimensional display 10, and accordingly, the area displayed in a second color increases and the area displayed in a first color decreases compared to those shown in FIG. 18B.

The three-dimensional information represented by the reconstructed image 40 is not limited to characters and marks, and can also be used as patterns representing machine-verifiable information such as QR codes, barcodes, data matrices or the like. Further, by verifying the integrated three-dimensional display 10 using the three-dimensional position coordinates of the light converging point Sn to determine whether it is genuine or counterfeit, high security can be achieved.

As described above, the three-dimensional information of the reconstructed image 40 can be authentication information. Further, when two-dimensional information representing identification information is recorded in the monochromatic region 22 that displays the reconstructed image 40 of three-dimensional information, the authentication information and the identification information can be inseparably integrated. Since a barcode includes bars arranged at predetermined intervals, the phase angle recorded area 18 is distributed when recorded on the reflective layer 24 of the recording surface 14. Accordingly, it is possible to prevent the entire reflective layer 24 from being removed in the region in which a zone plate is provided that reflects light from the recording surface 14 onto a single light converging point S.

The barcode can be JAN/EAN/UPC applied to a distribution code, ITF applied as a logistics product code, CODE39 applied as an industrial barcode, NW-7 applied to a delivery slip, or the like. Further, the barcode can include an error detection code or an error correction code. That is, it can include redundancy. In addition, although a barcode can binarize the reflectance so that data can be read as ON and OFF levels, it can also read multivalued reflectance. In addition, the two-dimensional information can be recorded across a plurality of monochromatic regions 22. Since forming a plurality of monochromatic regions 22 requires advanced processing technology, it can prevent counterfeiting of the two-dimensional information by recording the two-dimensional information across a plurality of monochromatic regions 22. Further, when the two-dimensional information is identification information, imposter scams using counterfeit identification information can be prevented.

Examples of the method of obtaining three-dimensional position coordinates include a method using a stereo camera, a method using a Kinect sensor which is commercially available, and a method by a scan in the depth direction using a transmissive pixel scanner.

Then, the three-dimensional position coordinates thus obtained can be subjected to arithmetic processing by using a point cloud library or the like to estimate three-dimensional features such as SHOT (signature of histograms of orientations) features, PFH (point feature histograms) features, and PPF (point pair feature) features, and compare the features with the correct three-dimensional position coordinates stored in the database to thereby determine whether the authentication medium 60 is genuine or counterfeit.

Next, a method of changing the properties of reflected light, i.e., a reflection spectrum without changing the depth T of the embossed layer 23 will be described.

In the above description in connection with FIG. 2 and the like, the method of changing the properties of reflected light, i.e., a reflection spectrum by changing the depth T of the embossed layer 23, has been described. However, the reflection spectrum can also be changed by demetallizing the metallic reflective layer 24 or by providing a print layer 28 without changing the depth T of the embossed layer 23.

Figure 19A:
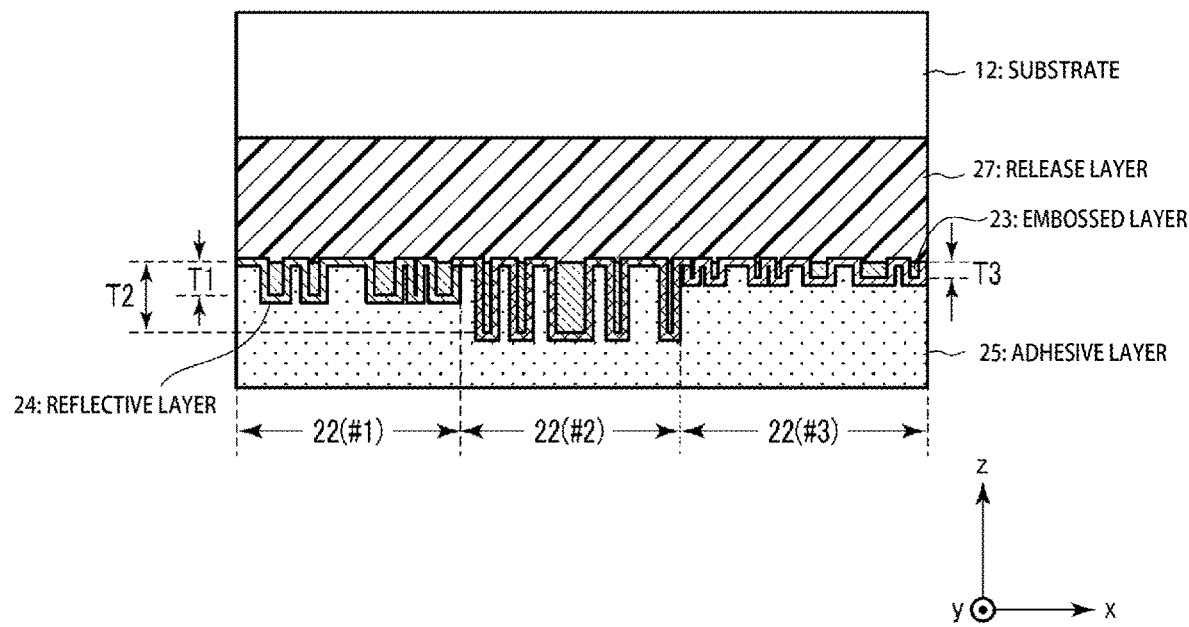
FIG. 19A is a cross-sectional view of an example of an integrated three-dimensional display according to an embodiment of the present invention, illustrating an example method of changing a reflection spectrum by demetallization (before demetallization).
Figure 19B:
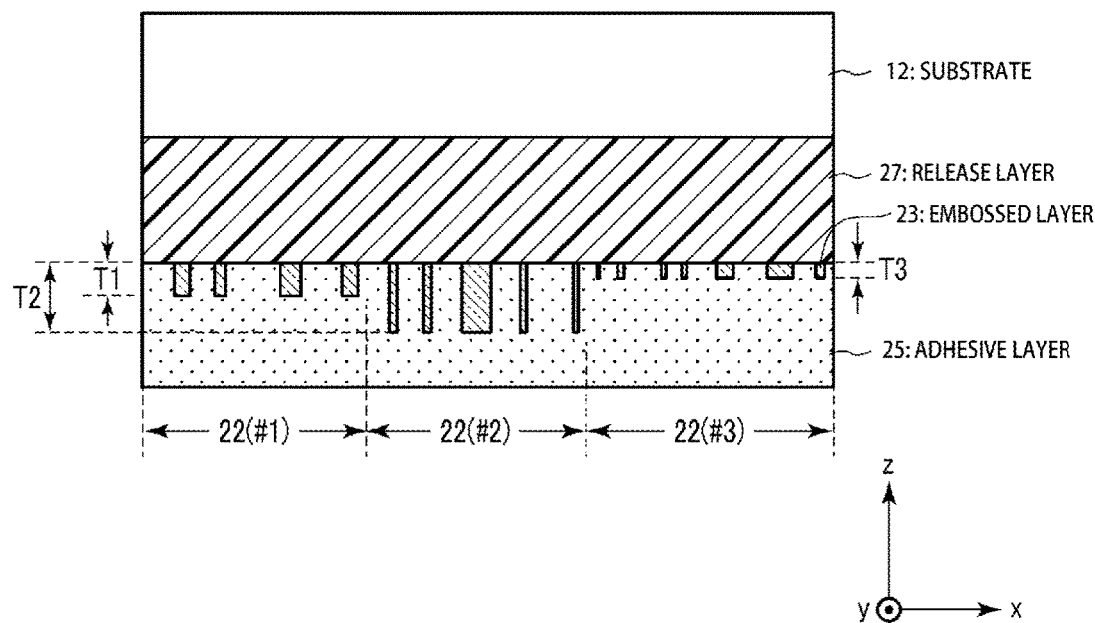
FIG. 19B is a cross-sectional view of an example of an integrated three-dimensional display according to an embodiment of the present invention, illustrating an example method of changing a reflection spectrum by demetallization (after demetallization).

With reference to FIGS. 19A and 19B, the method of changing the reflection spectrum by demetallizing the metallic reflective layer 24 will be described.

FIG. 19A is a cross-sectional view of an example of an integrated three-dimensional display according to an embodiment of the present invention, illustrating an example method of changing a reflection spectrum by demetallization.

FIG. 19A illustrates a cross-sectional configuration of an integrated three-dimensional display, in which the release layer 27 and the embossed layer 23 are laminated in this order on the substrate 12. Further, the embossed layer 23 is covered with the reflective layer 24. The reflective layer 24 is further covered with an adhesive layer.

Further, three monochromatic regions 22 (#1), (#2), and (#3) are arranged in this order in the x direction in the figure, each having their own value as a depth T of the embossed layer 23 in the same monochromatic region 22. In FIG. 19A, the embossed layer 23 in the monochromatic region 22 (#1) has a depth T1, the embossed layer 23 in the monochromatic region 22 (#2) has a depth T2, and the embossed layer 23 in the monochromatic region 22 (#3) has a depth T3, having the relationship of T2>T1>T3.

On the other hand, FIG. 19B is a cross-sectional view illustrating an embodiment in which part of the metal is removed by demetallizing part of the metallic reflective layer 24 shown in FIG. 19A. In this case, an adhesive layer is positioned on the reflective layer 24 or the embossed layer 23. The demetallization can be performed by laser engraving.

As the metallic reflective layer 24 is demetallized as shown in FIG. 19B from the configuration shown in FIG. 19A, the reflection spectrum of the embossed layer can be changed.

Such a mechanism by which the reflection spectrum changes due to demetallization will be described below with reference to FIGS. 20A and 20B.

Figure 20A:
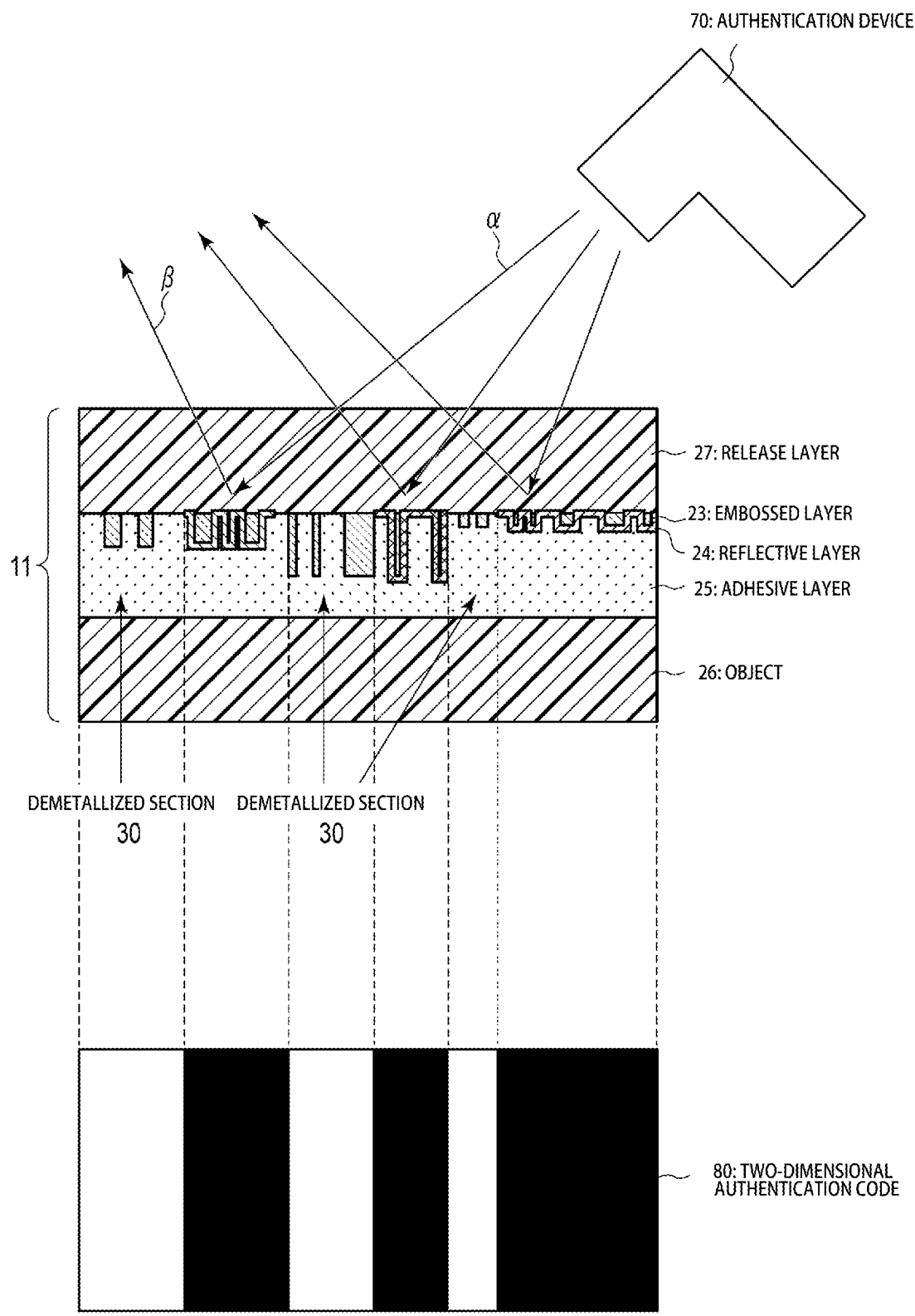
FIG. 20A is a conceptual diagram illustrating that inspection light emitted from an authentication device is reflected by a reflective layer.

FIG. 20A is a conceptual diagram illustrating inspection light α emitted from an authentication device 70 being reflected by the reflective layer 24.

Figure 20B:
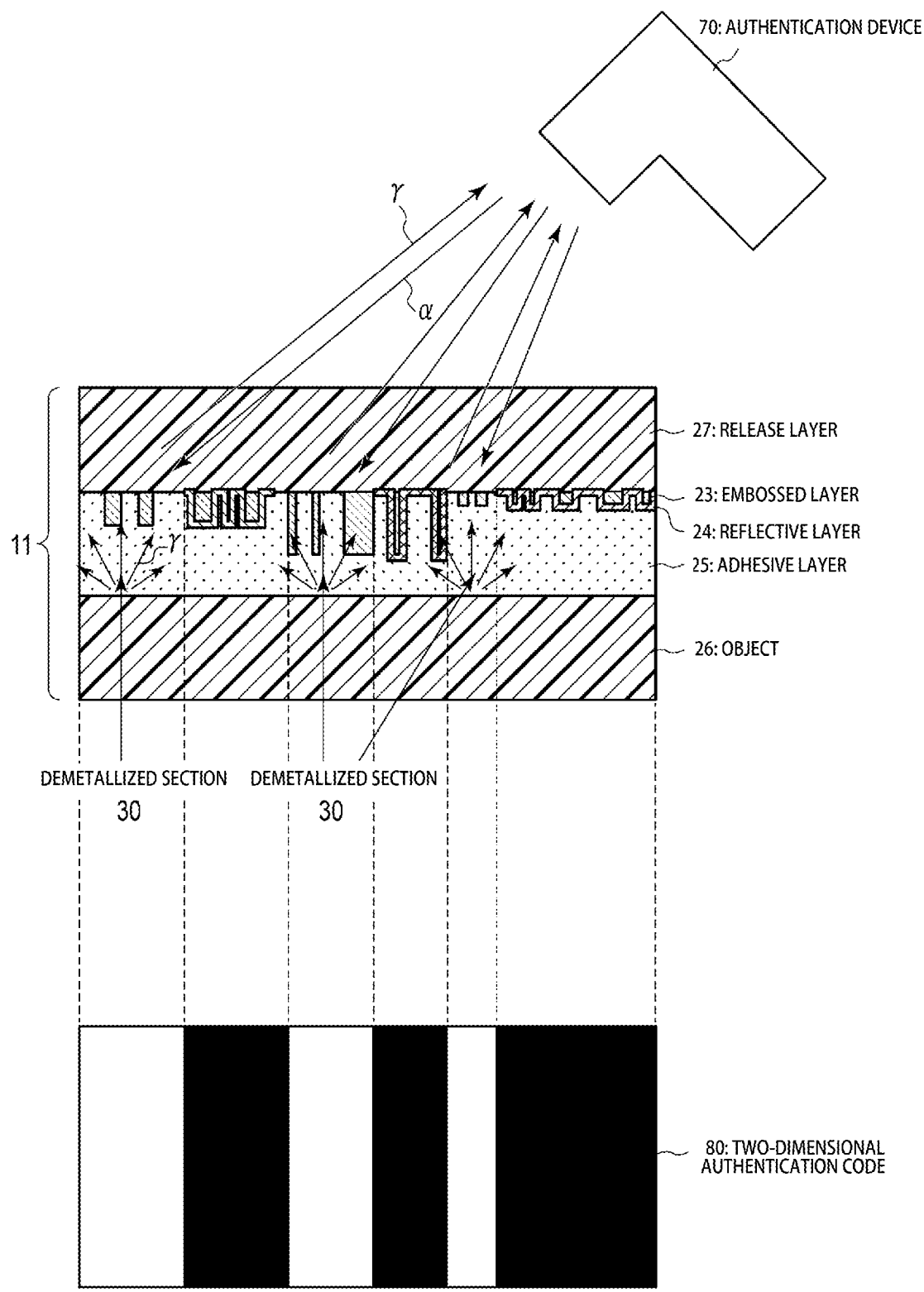
FIG. 20B is a conceptual diagram illustrating that inspection light emitted from an authentication device is transmitted through a demetallized section.

FIG. 20B is a conceptual diagram illustrating inspection light α emitted from the authentication device 70 being transmitted through a demetallized section 30.

FIG. 20A and FIG. 20B illustrate cross-sectional configurations of an integrated three-dimensional display 11, in which the substrate 12 is removed from the cross-sectional configuration shown in FIG. 19B, and the object 26 is adhered to the adhesive layer 25. In FIG. 20A, a demetallized portion of the metallic reflective layer 24 is indicated as the demetallized section 30.

The integrated three-dimensional display 11 is used to record a machine-readable code 80 shown in FIG. 20A and FIG. 20B by using the change in reflection spectrum due to demetallization.

The authentication device 70 is an apparatus configured to emit inspection light α toward the integrated three-dimensional display 11 and detect reflected light β from the integrated three-dimensional display 11 to thereby read a pattern of the machine-readable code, and may be, but is not limited to, a smartphone, a cash register reader, an optical spectrum device, or the like.

In this case, the authentication device 70 reads the pattern of the machine-readable code preferably in an angular range of 0(°) or more and 70(°) or less relative to the recording surface 14.

Since the inspection light α emitted from the authentication device 70 is reflected by the reflective layer 24 as shown in FIG. 20A, reflected light β does not return to the authentication device 70. Accordingly, as illustrated in FIG. 20B, the reflective layer 24 is recognized by the authentication device 70 as a portion corresponding to black in the machine-readable code.

On the other hand, the inspection light α emitted from the authentication device 70 is transmitted in the demetallized section 30 as illustrated in FIG. 20B, and reflected by the underlying object 26. In particular, when the object 26 is white, the inspection light α is scattered on a surface of the object 26 to generate scattered light γ. The scattered light γ returns to the authentication device 70, and is recognized as white by the authentication device 70. Accordingly, as illustrated in FIG. 20B, the demetallized section 30 is recognized by the authentication device 70 as a portion corresponding to white in the machine-readable code.

Next, with reference to FIGS. 21A and 21B, a method of changing the reflection spectrum by providing a print layer will be described.

Figure 21A:
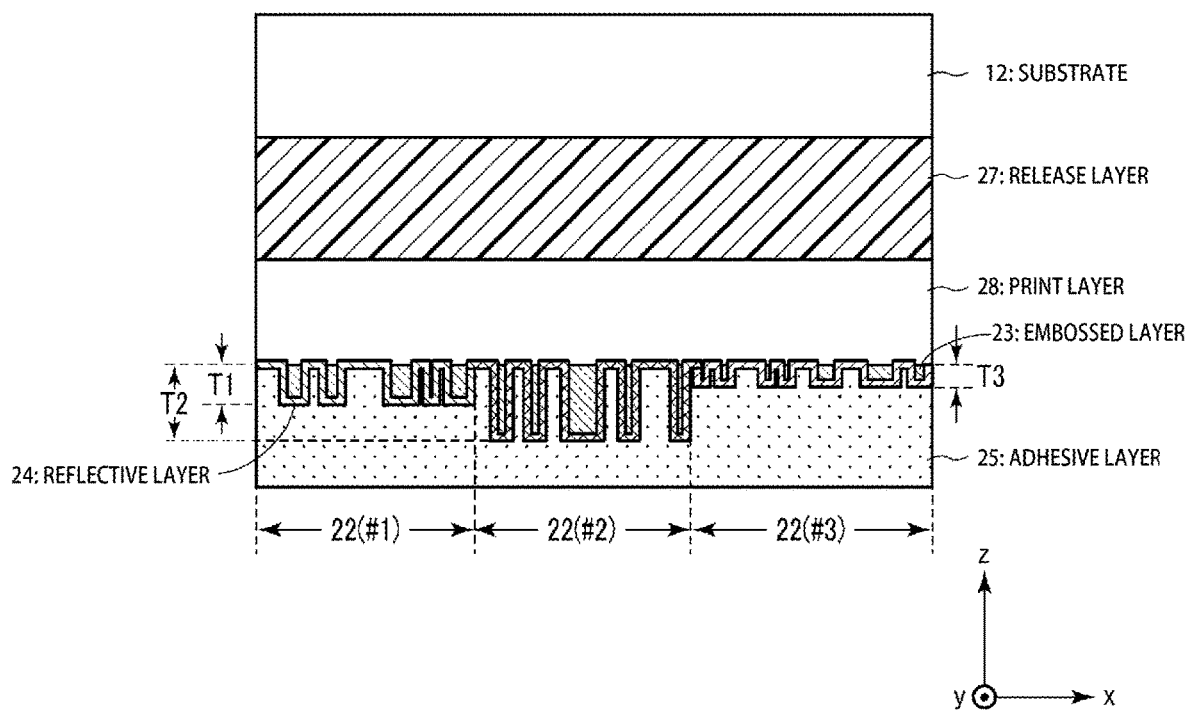
FIG. 21A is a cross-sectional view of one embodiment of an integrated three-dimensional display according to an embodiment of the present invention, illustrating a method of changing a reflection spectrum by providing a print layer (monochromatic region configuration).
Figure 21B:
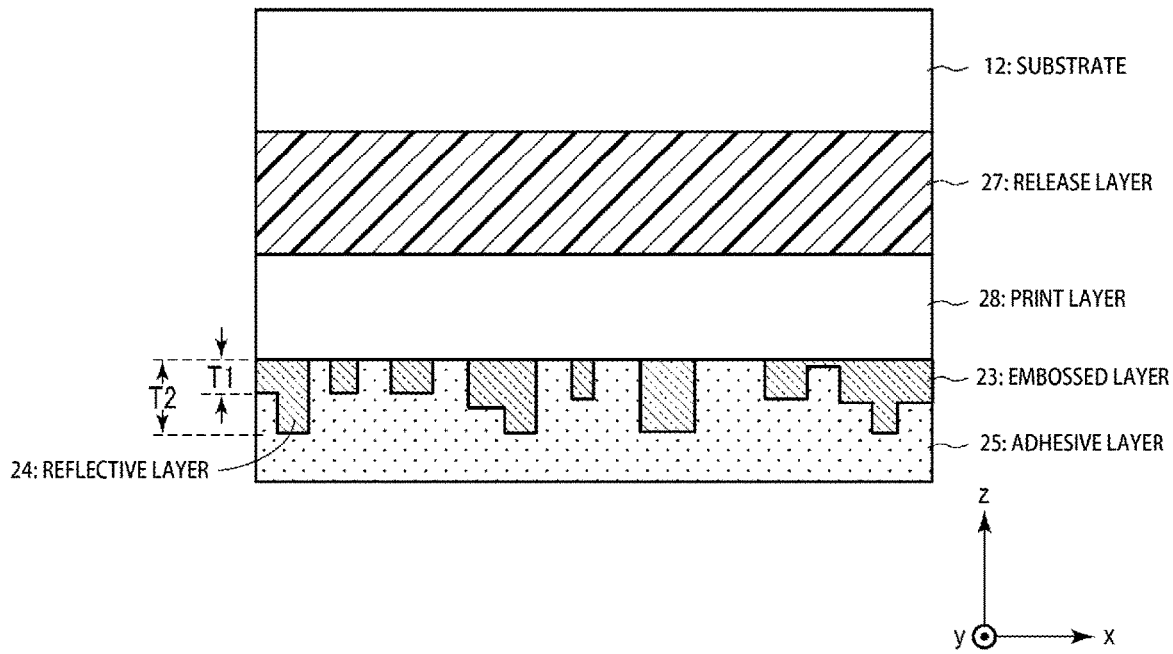
FIG. 21B is a cross-sectional view of one embodiment of an integrated three-dimensional display according to an embodiment of the present invention, illustrating a method of changing a reflection spectrum by providing a print layer (multi-level configuration).

FIGS. 21A and 21B are cross-sectional views of one embodiment of an integrated three-dimensional display according to an embodiment of the present invention, illustrating a method of changing a reflection spectrum by providing a print layer.

FIG. 21A shows a cross-sectional configuration, in which the print layer 28 is added between the release layer 27 and the embossed layer 23 in the configuration having the monochromatic region 22 shown in FIG. 19A. In this configuration, the reflection spectrum can be changed by providing the print layer 28 without changing the depth T of the embossed layer 23, and can also be changed by combination of the color of reflected light determined by the depth T of the embossed layer 23 with the print color. In addition, when the print layer 28 is added, the monochromatic region 22 may not be necessarily provided, and a multi-level configuration, in which the embossed layer 23 has a plurality of different depths T randomly distributed over the entire surface, as shown in FIG. 21B, is also possible.

Next, demetallization performed by a computer will be described below.

Figure 22:
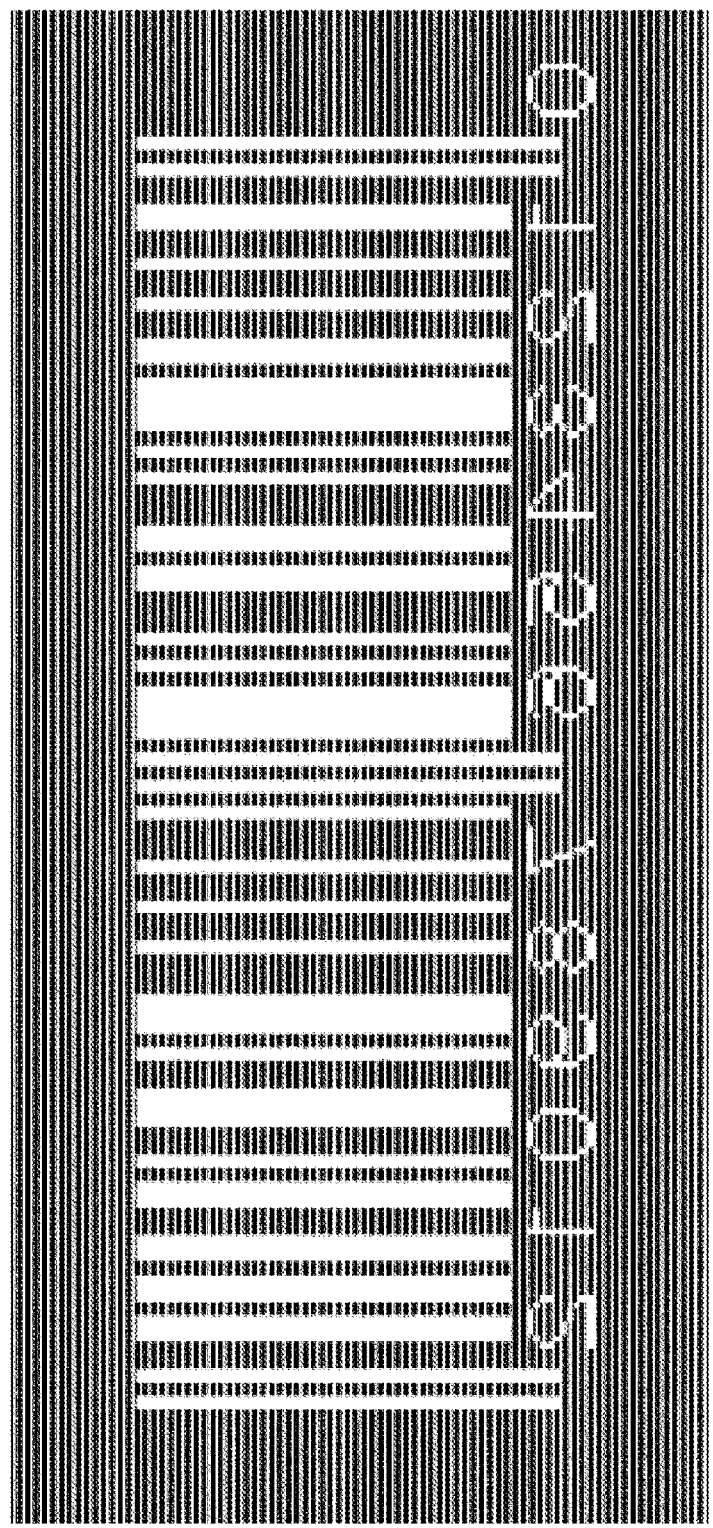
FIG. 22 is a diagram illustrating an example of condition data inputted to a computer to produce a two-dimensional barcode by demetallization.

FIG. 22 is a diagram illustrating an example condition data inputted to a computer to produce a two-dimensional barcode by demetallization. In FIG. 22, a white portion corresponds to a portion that is instructed to keep a metal in the metallic reflective layer 24, and a black portion corresponds to a portion that is instructed to demetallize a metal in the metallic reflective layer 24.

According to this condition data, a computer does not demetallize a metal of the reflective layer 24 corresponding to a white portion shown in FIG. 22, and demetallizes only a metal of the reflective layer 24 corresponding to a black portion shown in FIG. 22.

The portion which is not demetallized is recognized as a black portion as described above using FIG. 20A, while the portion which is demetallized is recognized as a white portion as described above using FIG. 20B.

Thus, the machine-readable code can be recorded by demetallizing a metal.

The recognition rate of the machine-readable code by the authentication device 70, and visibility of the reconstructed image 40 depend on the demetallization amount. When a metal section area before demetallization is S1 and a metal section area after demetallization is S2, the demetallization amount is defined by the following formula: demetallization amount (%)=(S1−S2)/S1. Further, the recognition rate is a ratio of recognized codes among the read codes.

Figures 23, 24:
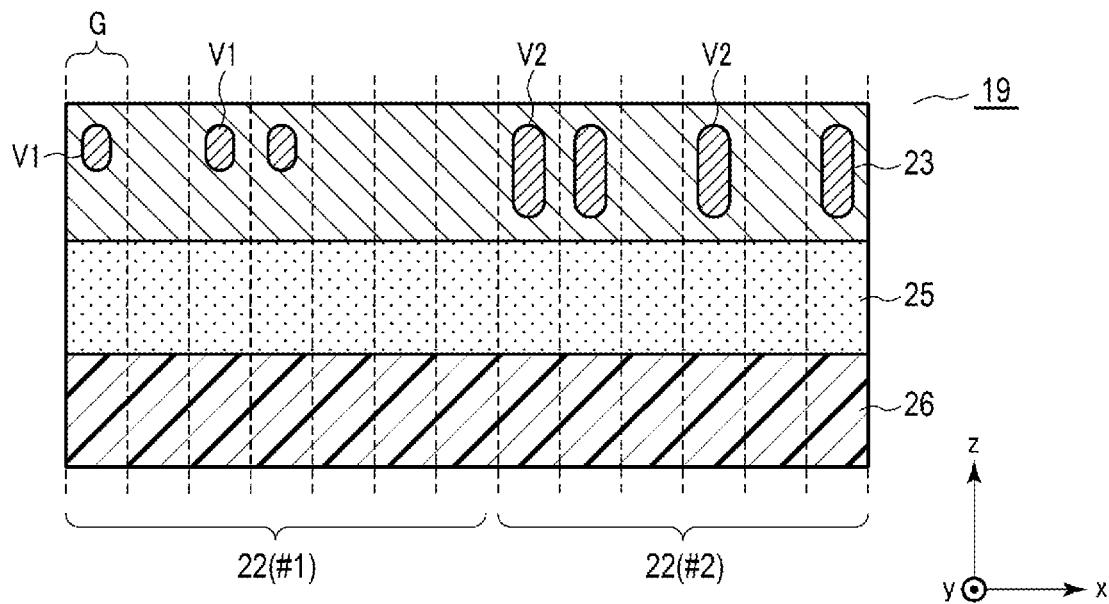
FIG. 23 is a table showing a relationship among a demetallization amount in a metallic reflective layer, a recognition rate of a machine-readable code, and visibility of a reconstructed image.
FIG. 24 is a cross-sectional view of an example in which a void having a void size according to a phase angle is embedded in a pixel.

FIG. 23 is a table showing a relationship among the demetallization amount in the portion of the metallic reflective layer 24 that is desired to be non-reflective, the recognition rate of the machine-readable code, and visibility of the reconstructed image 40.

As the demetallization amount of the metallic reflective layer 24 increases, the contrast of the machine-readable code increases. This facilitates authentication of the machine-readable code and increases the recognition rate per unit time, but decreases the brightness of the reconstructed image 40 and thus visibility of the reconstructed image 40.

In contrast, as the demetallization amount decreases, the brightness of the reconstructed image 40 increases, which increases visibility of the reconstructed image 40, whereas the contrast of the machine-readable code decreases and thus the recognition rate decreases.

FIG. 23 shows that both of good recognition rate and visibility of the reconstructed image 40 can be achieved when the demetallization amount in the portion of the metallic reflective layer 24 that is desired to be non-reflective is in the range of 30(%) or more and 70(%) or less.

Therefore, according to the integrated three-dimensional display of an embodiment of the present invention, demetallization is performed to 30(%) or more and 70(%) or less of a metal of the metallic reflective layer 24 that is desired to be non-reflective (for example, a portion of the machine-readable code to be displayed in white).

Next, materials of components of the integrated three-dimensional display according to an embodiment of the present invention will be described.

A material used for the substrate 12 can be a rigid material such as a glass substrate, or a film substrate. The substrate 12 may be a plastic film such as of PET (polyethylene terephthalate), PEN (polyethylene naphthalate), or PP (polypropylene). Preferably, the material of the substrate 12 may be one that is less likely to deform or alter due to heat, pressure, or the like applied at the time of providing the recording surface 14. Depending on the usage or purpose, paper, synthetic paper, plastic multilayer paper, resin-impregnated paper, or the like may be used as the substrate 12.

The release layer 27 can be formed of a resin and a lubricant. The resin may preferably be a thermoplastic resin, a thermosetting resin, an ultraviolet curable resin, or an electron beam curable resin. The resin can be an acrylic resin, a polyester resin, or a polyamide resin. The lubricant may preferably be a wax of polyethylene powder, a paraffin wax, silicone, carnauba wax, or the like. These materials may be applied to the substrate 12 by a known coating method such as gravure printing or micro gravure printing to form the release layer 27. The release layer 27 can have a thickness in the range of 0.1 (µm) or more and 2 (µm) or less. The release layer 27 can be provided with hard coating properties to protect the recording surface 14 and the two-dimensional information. The hard coating properties may refer to the hardness in the range of H or more and 5H or less in the pencil hardness test (JIS K5600-5-4).

The embossed layer 23 may have a resin matrix. The resin may preferably be a thermoplastic resin, a thermosetting resin, an ultraviolet curable resin, a thermoformable material having a radically polymerizable unsaturated group, an electron beam curable resin, or the like. Resins that can be used may be urethane resins, polycarbonate resins, polystyrene resins, thermoplastic resins of polyvinyl chloride resins, unsaturated polyester resins, melamine resins, epoxy resins, urethane (meth)acrylate, polyester (meth)acrylate, epoxy (meth)acrylate, polyol (meth)acrylate, melamine (meth) acrylate, or triazine (meth)acrylate. The embossed layer 23 can have a thickness in the range of 0.5 (µm) or more and 5 (µm) or less.

The reflective layer 24 can be made of a metal. The metallic reflective layer 24 easily absorbs laser light, and is suitable for laser engraving. Examples of the metallic reflective layer 24 include aluminum, silver, tin, chromium, nickel, copper, and gold. Further, the material of the reflective layer 24 can be a metal compound. Examples of the metal compound reflective layer 24 include zinc sulfide, titanium oxide, silicon oxide, and iron oxide. Further, the silicon oxide can be Si2O3, SiO, or the like. The reflective layer 24 of a metal compound, or a silicon oxide can be light transmissive. The reflective layer 24 is formed on the entirety or part of the embossed layer 23. The reflective layer 24 may be a single layer or multilayer. The multilayer can be the reflective layer 24 composed of two layers of a metal layer and a metal compound or a silicon oxide. When the metal layer is partially formed in the reflective layer 24, a region in which the metal layer is formed is selectively engraved to record two-dimensional information. In particular, the outer shape of the metal layer can be formed to have chromatic patterns or the like to improve anti-counterfeiting properties.

The reflective layer 24 can be made of an inorganic compound other than metal. Inorganic compounds have a high refractive index and easily increase reflectance.

In production of the reflective layer 24 made of a metal, a metal compound, or an inorganic compound, a vapor deposition method can be used.

The vapor deposition method may use evaporation, CVD or sputtering. The reflective layer 24 preferably has a thickness in the range of 40 (nm) or more and 1000 (nm) or less. When the thickness is 40 (nm) or more, the outline of the demetallized section becomes clear during laser engraving. When the thickness is 1000 (nm) or less, the reflective layer can be prevented from cracking during laser engraving or the like. The reflective layer 24 preferably has a reflectance in the range of 30(%) or more and 95(%) or less. When the reflectance of the reflective layer 24 is 30(%) or more, sufficient reflection is obtained. On the other hand, when the reflectance of the reflective layer 24 is greater than 95(%), processing of the reflective layer 24 becomes difficult although sufficient image brightness is obtained.

The reflective layer 24 can also be formed by using ink that absorbs laser light. The ink may be an offset ink, a letterpress ink, a gravure ink, or the like, depending on the printing method. Depending on the difference in composition, a resin ink, an oil-based ink, or a water-based ink may be used. Furthermore, depending on the difference in drying method, the ink may be an oxidative polymerization ink, a penetrative drying ink, an evaporation drying ink, or an ultraviolet curable ink. In addition, functional ink whose color varies depending on the illumination angle or observation angle can also be used. Such a functional ink may be an optically variable ink, a color shift ink, or a pearl ink.

The integrated three-dimensional display illustrated in FIGS. 2, 20A, and 20B is attached to the object 26. This attachment can be performed by thermal pressure transfer. In other words, processing for attachment can be thermal pressure transfer. The object 26 can be a print medium. The object 26 may be a bill, coupon, card, board, poster, tag, seal, or the like. Cards, boards, and tags generally have a flat surface, and provide good readability of codes, and a 3D image with reduced distortion. The object 26 may be made of paper, polymer, or the like. Paper, polymer, or the like can be adhered via the adhesive layer 25. Further, in addition to paper and polymer, the material may also be metals, ceramics, or other materials that can be adhered via the adhesive layer 25.

The adhesive layer 25 may be any material that can adhere the integrated three-dimensional display 10 to the object 26, and can be a pressure-sensitive adhesive with tackifier, thermoplastic adhesive, or the like.

Further, when a surface of the integrated three-dimensional display 10 is damaged by scratching or the like, the reconstructed image 40 may be blurred. Therefore, a protective layer (not shown) may be provided on a surface of the integrated three-dimensional display 10. The protective layer may also be provided with hard coating properties. The hard coating properties may refer to the hardness in the range of H or more and 5H or less in the pencil hardness test (JIS K5600-5-4). This prevents a surface of the integrated three-dimensional display 10 from being damaged by scratching or the like.

The integrated three-dimensional display 10 preferably has a surface with a gloss at 20° (Gs(20°)) in the range of 15 or more and 70 or less When the gloss at 20° (Gs(20°)) is less than 15, non-glare properties become prominent, and the light converging point Sn cannot reconstruct a good image.

On the other hand, when the gloss at 20° (Gs(20°)) is greater than 70, non-glare properties become insufficient, and reflected light may appear in the reconstructed image 40, making it difficult to capture or observe the reconstructed image 40. More preferably, the gloss at 20° (Gs(20°)) may be in the range of 20 or more and 60 or less.

The recording surface 14 may preferably have a transmitted image clarity defined by (C(0.125)+C(0.5)+C(1.0)+C(2.0)) of 200% or more. Furthermore, the recording surface 14 may have a haze (Hz) of 1.0% or more and 25% or less. Gloss at 20° was measured according to JIS-K7105-1981 by using a gloss meter (micro-TRI-gloss, manufactured by BYK-Gardner). Transmitted image clarity was measured according to JIS-K7105-1981 by using an image clarity meter (product name: ICM-1DP, manufactured by Suga Test Instruments Co., Ltd.).

Light transmitted through the non-glare film can be calculated from a maximum wavelength M and a minimum wavelength m, which are measured by permitting light to pass through a moving optical comb, based on a formula C=(M−m)/(M+m)×100. As the transmitted image clarity C (%) increases, the clearer and better the image obtained. Since optical combs of four different widths (0.125 (mm), 0.5 (mm), 1.0 (mm), and 2.0 (mm)) were used for the measurement, 100%×4=400(%) will be the maximum value.

Haze (Hz) was measured according to JIS-K7105-1981 by using a haze meter (NDH2000, manufactured by Nippon Denshoku Industries, Co., Ltd.).

Total luminous reflectance can be measured according to JIS-K7105 by using a spectrophotometer U-4100 manufactured by Hitachi High-Technologies Corporation, and collecting total light with an integrating sphere.

According to another embodiment of the integrated three-dimensional display 11 having the cross-sectional configuration shown in FIGS. 19A and 19B, the release layer 27 may be omitted, and the recording surface 14 may be directly laminated on the substrate 12. In this case, since no release layer 27 is provided, the substrate 12 remains after attachment to the object 26 via the adhesive layer 25.

When the substrate 12 forms a print layer, a matte paper sheet is preferably used. Examples of the matte paper sheet include high quality paper, medium quality paper, matte coated paper, and art paper. The print layer can also be formed using an ink.

The ink may be pigment ink or dye ink. The pigment ink may be of organic compound or inorganic compound. Inorganic pigments include graphite, cobalt, titanium, and the like. Organic pigments include phthalocyanine compounds, azo pigments, organic complexes, and the like. Further, fluorescent or phophorescent pigment can also be used.

Furthermore, the print layer can also be formed by dispersing a pigment in a polymer matrix, and printing. Examples of the polymer matrix include acrylic resin, urethane resin, and rosin. The additive amount of the pigment is preferably 0.1(%) or more and 10(%) or less. The dye ink may be an organic dye ink.

Organic dyes include natural dyes and synthetic dyes. Synthetic dyes include azo dye, organic complex dye, and the like. Further, fluorescent or phophorescent dye may be used. The print layer can also be formed by dispersing a dye in a polymer matrix, and printing. Examples of the polymer matrix include acrylic resin, urethane resin, and rosin. The additive amount of the dye is preferably 0.5% or more and 30% or less.

As described above, according to the integrated three-dimensional display to which a method of recording identification information of an embodiment of the present invention is applied, it is possible to reduce computation time by a computer due to the calculated element region being provided, reduce the noise of spatial information, and obtain a clear hologram.

In the calculation, in particular, the phase angle $\varphi$ can be calculated and recorded. Such a phase hologram can modulate only the phase components of light while achieving high diffraction efficiency. Thus, light can be controlled while the brightness of light being kept high.

Further, computation time by a computer can be further reduced by limiting the area for recording the phase angle $\varphi$ within the overlap area 19. In addition, the percentage of light illuminating the integrated three-dimensional display 10 can also be controlled.

Still further, when a portion of the calculated element region 16 other than the phase angle recorded area 18 is defined as a phase angle non-recorded area 20, the reconstructed image 40 reconstructed at the light converging points Sn can have a brightness lower than that in a case where no phase angle non-recorded area 20 is provided by the amount represented by (phase angle recorded area 18)/(phase angle recorded area 18+phase angle non-recorded area 20). Thus, the brightness of light can be controlled.

Moreover, the three-dimensional reconstructed image 40 can be reconstructed only when the phase angle recorded area 18 is illuminated with light. That is, the larger the phase angle recorded area 18, the brighter the reconstructed image 40, and the smaller the phase angle recorded area 18, the darker the reconstructed image 40. Although capable of reconstructing only a dark reconstructed image 40, the phase angle non-recorded area 20 can be used as another optical element.

Furthermore, when the overlap area 19 is composed of one monochromatic region 22, a monochromatic image can be three-dimensionally reconstructed. When the overlap area 19 is composed of a plurality of monochromatic regions 22, a color image can be three-dimensionally reconstructed.

When the two-dimensional information 50 is provided on the recording surface 14 to overlap at least part of the reconstructed image 40 in a depth direction of the recording surface 14, anti-counterfeiting properties can be greatly enhanced.

Still further, when the two-dimensional information 50 is provided on the recording surface 14, it can be positioned not to cover the entire surface of the overlap area 19 to prevent the light converging point Sn reconstructed from the overlap area 19 from disappearing.

At least one of the reconstructed image 40 and the two-dimensional information 50 can be used as personal identification information. Alternatively, a dynamic three-dimensional reconstructed image 40 and a non-dynamic two-dimensional information 50 such as a character or a mark can be displayed in combination. Further, anti-counterfeiting properties of the two-dimensional information 50 can also be enhanced.

Moreover, one of a planar shape of the monochromatic region 22, the two-dimensional information 50, and the reconstructed image 40, a composite thereof, or a combination thereof can represent a machine-readable code. The machine-readable code can be a QR code, a barcode, a data matrix, or the like. Accordingly, a variable code having further enhanced anti-counterfeiting properties can be produced.

Further, when information other than a phase angle is recorded in the phase angle non-recorded area 20 in the calculated element region 16, information other than the phase components of light of the three-dimensional reconstructed image 40, such as scattering, reflection, and diffraction properties of light, can be controlled by the phase angle non-recorded area 20.

Furthermore, the phase angle can be converted into the depth of the pixel, and can be recorded in the overlap area 19.

Still further, the respective calculated element regions 16 positioned on the recording surface 14 without overlapping other calculated element regions 16 can have different colors to thereby reconstruct a full-color three-dimensional reconstructed image 40. Further, when the recording surface 14 includes a metallic reflective layer 24, the reflection efficiency of light can be improved so that a bright reconstructed image 40 can be reconstructed.

The integrated three-dimensional display 10 and 11 can be attached to the object 26. Furthermore, although the reconstructed image 40 is blurred and may not be clearly visible depending on the size and number of illumination sources such as fluorescent lamps in a typical office environment or the like, the reconstructed image 40 can be clearly visible when illuminated with an LED, which is a point light source, or a light source of a smartphone or a cash register reader.

Further, when the reflective layer 24 is made of a metal, the metal can be demetallized by laser engraving to record a machine-readable code. Identification information can be recorded in this pattern. As the demetallization amount increases, authentication of the machine-readable code becomes easier, whereas the brightness of the three-dimensional reconstructed image 40 decreases. Therefore, when 30(%) or more and 70(%) or less of a metal of the portion of the metallic reflective layer 24 that is desired to be non-reflective is demetallized, it is possible to obtain both the ease of authentication of a code pattern and sufficient brightness for the reconstructed image 40.

As described above, according to the integrated three-dimensional display to which a method of recording identification information of an embodiment of the present invention is applied, a three-dimensional image that can be reconstructed in full-color without causing iridescence and is suitable for mass production, in combination with a machine-readable code, can be provided.

[First Modification]

A first modification of the present invention will be described. The present embodiment can be combined with other embodiments.

In the following description, differences from the first embodiment of the present invention will be described.

In the first embodiment of the present invention described above, a stamper is used to form the monochromatic region 22 having the pixel depth T according to the phase angle. However, as another technique, a silver halide exposure material may be exposed and developed, and then bleached, followed by modifying the developed silver into a silver salt such as silver halide to make the material transparent. Alternatively, a thermoplastic or the like, whose refractive index or surface configuration changes due to light, may be used.

With this configuration as well, reflected light can converge on the light converging points Sn to reconstruct a desired holographic reconstructed image 40, and, as described in the first embodiment, a three-dimensional image that can be reconstructed in full-color without causing iridescence and is suitable for mass production, in combination with a machine-readable code, can be provided.

[Second Modification]

A second modification of the present invention will be described. The present embodiment can be combined with other embodiments.

In the following description, differences from the first embodiment of the present invention will be described.

In the first embodiment of the present invention described above, in order to reconstruct the holographic reconstructed image 40, the phase angle $\varphi$ calculated based on the phase component is recorded in the corresponding pixel of the overlap area 19, and the depth T of the pixel g according to the phase angle $\varphi$ is further recorded.

In the second modification of the present invention, in order to reconstruct the holographic reconstructed image 40, a void having a void size modulated according to the phase angle $\varphi$ is embedded instead of the depth T according to the phase angle $\varphi$ being recorded in the corresponding pixel g of the overlap area 19.

FIG. 24 is a cross-sectional view of an example in which a void having a void size according to a phase angle is embedded in a pixel.

In this configuration, as shown in FIG. 24, a void having a void size according to the phase angle $\varphi$ which is calculated at the coordinates of each pixel g is embedded in the pixel g constituting the monochromatic region 22 in the overlap area 19.

FIG. 24 illustrates two monochromatic regions 22 (#1) and (#2), and some of the pixels g in the monochromatic region 22 (#1) include a void V1 having a void size modulated according to the phase angle $\varphi$ which is calculated in the monochromatic region 22 (#1).

Similarly, some of the pixels g in the monochromatic region 22 (#2) include a void V2 having a void size modulated according to the phase angle $\varphi$ which is calculated in the monochromatic region 22 (#2).

With this configuration as well, reflected light can converges on the light converging points Sn to reconstruct a desired holographic reconstructed image 40, and, as described in the first embodiment of the present invention, a three-dimensional image that can be reconstructed in full-color without causing iridescence and is suitable for mass production, in combination with a machine-readable code, can be provided.

The invention of the present application is not limited to the embodiments described above, and may be modified in various ways at the stage of implementation, without departing from the spirit of the present invention. The embodiments of the present invention may be adequately combined and implemented, and the combinations each have advantageous effects accordingly. Furthermore, the embodiments of the present invention described above include inventions of various stages. Therefore, a plurality of disclosed elements may be appropriately combined so that various inventions can be obtained.

What is claimed is:

1. An integrated three-dimensional display, comprising:
   a recording surface on which information for reconstructing a hologram is recorded, wherein the recording surface includes
a calculated element region in which phase components of light from light converging points of a holographic reconstructed image are calculated, the calculated element region being defined by one-to-one correspondence to the light converging points, and
a phase angle recorded area for recording a phase angle calculated based on the phase components, the phase angle recorded area includes a plurality of monochromatic regions having a uneven structure surface in which protrusion structures and recess structures are alternately arranged at a pitch that is an integral multiple of a predetermined resolution, the phase angle is recorded in an overlap area in which the calculated element region and the phase angle recorded area overlap each other, and light converges on the light converging points at specific distances from the recording surface, the specific distances being determined for the respective light converging points even when light reflected from the plurality of monochromatic regions converges,
wherein the phase angle is calculated as φ according to the following formula:

$$W(kx, ky) = \sum_{n=0}^{Nmax} \sum_{ky=Ymin}^{Ymax} \sum_{kx=Xmin}^{Xmax} amp \cdot \exp(i\phi)$$

$$\phi = \frac{\pi}{\lambda \cdot O_n(z)} \{(O_n(x) - kx)^2 + (O_n(y) - ky)^2\}$$

where (kx, ky) are coordinates of a pixel that constitutes the monochromatic regions, W (kx, ky) represents the phase components of the coordinates (kx, ky), n is an index of the light converging points Sn (n=0 to Nmax), amp is an amplitude of light at the light converging points, i is an imaginary number, λ is a wavelength of light in reconstruction of the reconstructed image, On (x, y, z) represents coordinates of the light converging points, and Xmin, Xmax, Ymin, and Ymax are coordinates indicating a range of the calculated element region defined for the respective light converging points.

2. The integrated three-dimensional display of claim 1, wherein two-dimensional information is provided on the recording surface to overlap at least part of the reconstructed image in a depth direction of the recording surface.

3. The integrated three-dimensional display of claim 2, wherein the two-dimensional information is provided on the recording surface and does not cover an entire surface of the phase angle recorded area.

4. The integrated three-dimensional display of claim 2, wherein at least one of the reconstructed image and the two-dimensional information includes personal identification information.

5. The integrated three-dimensional display of claim 2, wherein at least one of a shape of the monochromatic regions on the recording surface, a shape of the two-dimensional information, and a shape of the reconstructed image represents a character or a mark.

6. The integrated three-dimensional display of claim 2, wherein at least one of a shape of the monochromatic regions on the recording surface, a shape of the two-dimensional information, and a shape of the reconstructed image represents a machine-readable code.

7. The integrated three-dimensional display of claim 1, wherein the recording surface further includes a phase angle non-recorded area that does not record a phase angle, and the phase angle non-recorded area in the calculated element region has a mirror surface.

8. The integrated three-dimensional display of claim 1, wherein the recording surface further includes a phase angle non-recorded area that does not record the phase angle, and information other than the phase angle can be recorded in the phase angle non-recorded area in the calculated element region.

9. The integrated three-dimensional display of claim 8, wherein the information other than the phase angle is information including at least one of scattering, reflection, and diffraction of light.

10. The integrated three-dimensional display of claim 1, wherein a number of types of the monochromatic regions corresponds to a number of colors required to reconstruct the hologram, a color of reflected light reflected from the monochromatic regions is one of the colors required to reconstruct the hologram, a depth of the recess structures in each of the monochromatic regions is determined depending on the color of reflected light, and the determined depth of the recess structures is recorded in the monochromatic regions in the overlap area instead of the phase angle being recorded in the overlap area.

11. The integrated three-dimensional display of claim 1, wherein a void is embedded in the overlap area instead of the phase angle being recorded in the overlap area, the void having a void size modulated according to the phase angle.

12. The integrated three-dimensional display of claim 1, comprising a plurality of the calculated element regions, wherein, among the plurality of calculated element regions, the respective calculated element regions positioned on the recording surface without overlapping other calculated element regions are colored in different colors from other calculated element regions.

13. The integrated three-dimensional display of claim 1, wherein the recording surface includes a metallic reflective layer.

14. The integrated three-dimensional display of claim 1, wherein the integrated three-dimensional display is attached to an object.

15. The integrated three-dimensional display of claim 1, wherein a distance between the recording surface and each of the light converging points is in a range of 0.5 (mm) or more and 50 (mm) or less, and the integrated three-dimensional display is designed to be observed in an angular range of 0 (0) or more and 70 (0) or less relative to a direction normal to the recording surface.

16. A method of recording identification information comprising demetallizing the metallic reflective layer corresponding to identification information to thereby record the identification information on the integrated three-dimensional display of claim 13.

17. The method of recording identification information of claim 16, wherein the identification information is a machine-readable code, and the demetallizing includes demetallizing 30(%) or more and 70(%) or less of a metal of a portion of the metallic reflective layer which is desired to be non-reflective in order to produce the machine-readable code by combining reflection and non-reflection.

18. A method of recording identification information comprising: providing a print layer on the recording surface; and recording identification information on the print layer to thereby record the identification information on the integrated three-dimensional display of claim 1.

* * * * *